(12) United States Patent
Jaramillo et al.

(10) Patent No.: US 12,420,330 B2
(45) Date of Patent: Sep. 23, 2025

(54) SYSTEM AND METHOD FOR DRILLING HOLES AND INSTALLING FASTENERS IN VEHICLE STRUCTURES

(71) Applicant: SPIRIT AEROSYSTEMS, INC., Wichita, KS (US)

(72) Inventors: Todd B. Jaramillo, Wichita, KS (US); John Robert Dye, III, Wichita, KS (US); Kaelan Cordell Roberts, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 770 days.

(21) Appl. No.: 17/669,559

(22) Filed: Feb. 11, 2022

(65) Prior Publication Data

US 2022/0161315 A1 May 26, 2022

Related U.S. Application Data

(63) Continuation-in-part of application No. 16/718,493, filed on Dec. 18, 2019, now Pat. No. 11,370,073.

(51) Int. Cl.
*B21J 15/38* (2006.01)
*B64F 5/10* (2017.01)

(52) U.S. Cl.
CPC ............... *B21J 15/383* (2013.01); *B64F 5/10* (2017.01)

(58) Field of Classification Search
None
See application file for complete search history.

(56) References Cited

U.S. PATENT DOCUMENTS 2,318,191 A * 5/1943 Bloomfield .............. B21J 15/36
29/243.54
2,377,416 A * 6/1945 Haberstump ............ B21J 15/36
269/21

(Continued)

FOREIGN PATENT DOCUMENTS

CN 1134126 A * 10/1996 ............... B25C 1/14
CN 111054873 A * 4/2020

(Continued)

OTHER PUBLICATIONS

International Search Report and Written Opinion mailed Feb. 11, 2021 for PCT/US2020/064769; filed Dec. 14, 2020.

(Continued)

*Primary Examiner* — Jacob J Cigna
(74) *Attorney, Agent, or Firm* — Stinson LLP

(57) ABSTRACT

A system and method for drilling a hole in a vehicle structure and installing a fastener in the hole. A drill plate having openings and associated machine-readable elements is positioned on the structure. A drill gun is positioned in a particular opening and reads hole information from the associated element, and a computer determines whether the drill gun is properly set-up to drill the hole. A fastener insertion gun is positioned in the particular opening and reads fastener information from the element, and the computer determines whether the hole has been drilled and, if so, whether the fastener insertion gun is properly set-up to insert the fastener. A fastener delivery subsystem stores, tracks, and delivers fasteners to the fastener insertion gun. A system computer monitors the drilling of every hole, the insertion of every fastener, and the overall operation of the fastener delivery subsystem.

18 Claims, 28 Drawing Sheets

(56) References Cited

U.S. PATENT DOCUMENTS

| | | | | |
|---|---|---|---|---|
| 2,915,926 | A * | 12/1959 | Woerner | B23B 49/023 |
| | | | | 408/115 B |
| 3,934,330 | A * | 1/1976 | Briles | B21J 15/36 |
| | | | | 29/243.54 |
| 6,210,084 | B1 * | 4/2001 | Banks | B23Q 9/0007 |
| | | | | 408/97 |
| 6,536,100 | B2 * | 3/2003 | Sarh | B64F 5/10 |
| | | | | 29/709 |
| 7,232,273 | B2 * | 6/2007 | Nealon | B05C 17/00516 |
| | | | | 401/265 |
| 8,950,054 | B2 * | 2/2015 | Sarh | B25B 11/002 |
| | | | | 335/289 |
| 9,021,677 | B1 * | 5/2015 | Burns | B21J 15/142 |
| | | | | 29/407.08 |
| 9,259,779 | B2 * | 2/2016 | Sarh | B21J 15/40 |
| 9,440,284 | B2 * | 9/2016 | Sarh | B21J 15/32 |
| 10,265,760 | B2 * | 4/2019 | Dixon | B21J 15/142 |
| 10,675,672 | B2 * | 6/2020 | Beisner | B21J 15/105 |
| 11,370,073 | B2 * | 6/2022 | Schroeder | B23B 49/026 |
| 11,491,533 | B2 * | 11/2022 | Jaramillo | B21J 15/48 |
| 2009/0112925 | A1 | 4/2009 | Amirehteshami et al. | |
| 2014/0025196 | A1 * | 1/2014 | Hain | B23K 11/0053 |
| | | | | 700/192 |
| 2017/0106452 | A1 | 4/2017 | Andersson et al. | |

FOREIGN PATENT DOCUMENTS

| | | | | |
|---|---|---|---|---|
| GB | 561557 | | 5/1944 | |
| GB | 2079214 B | * | 1/1984 | B25D 9/145 |
| JP | 2007087249 | | 4/2007 | |
| JP | 2008502496 A | * | 1/2008 | |
| KR | 100157767 | | 6/1997 | |
| WO | WO-2014081404 A1 | * | 5/2014 | B21J 15/02 |
| WO | 2014120345 | | 8/2014 | |
| WO | WO-2018141052 A1 | * | 8/2018 | B25B 21/02 |

OTHER PUBLICATIONS

European Search Report in related EP Application 23155917.0 dated Jun. 30, 2023, 10 pages.

* cited by examiner

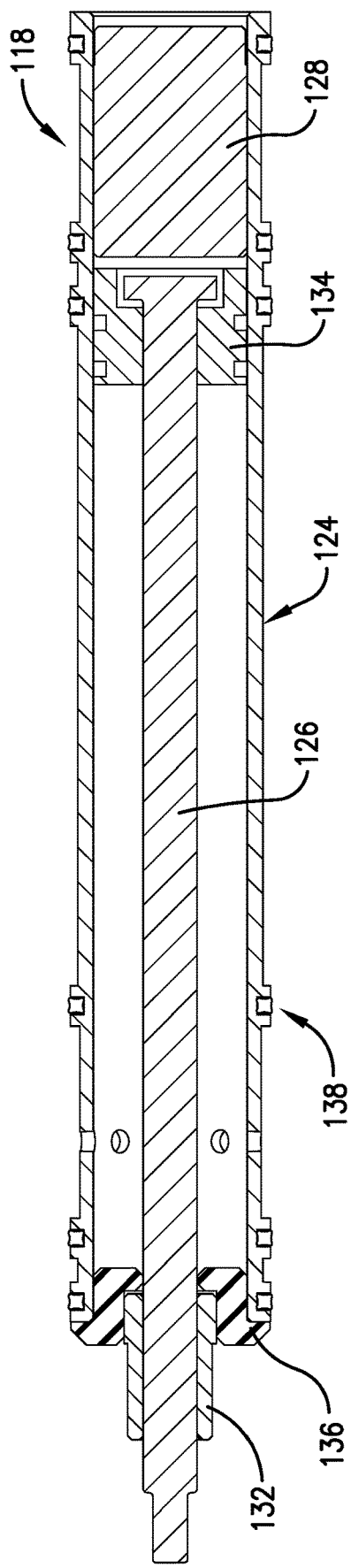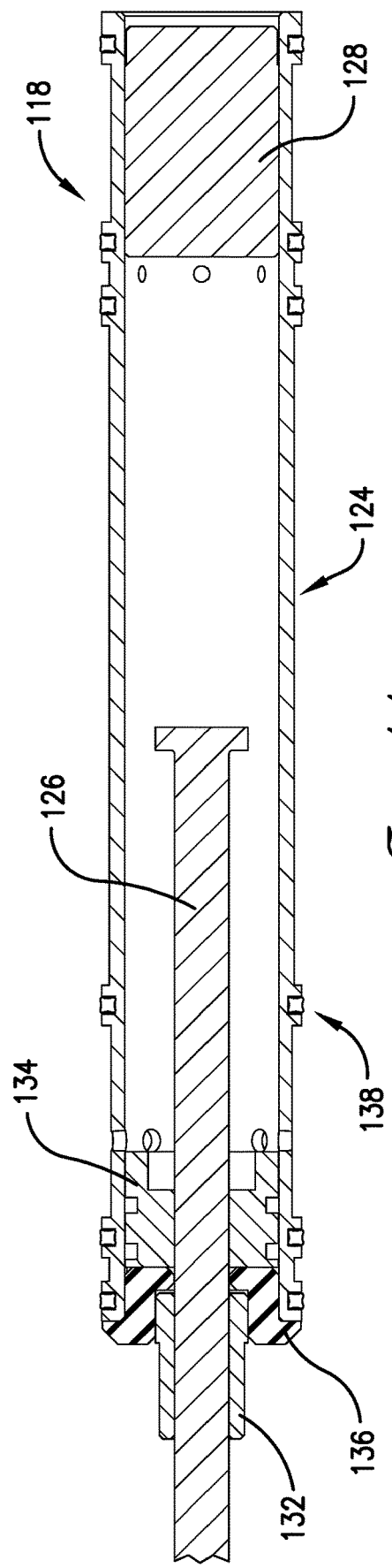

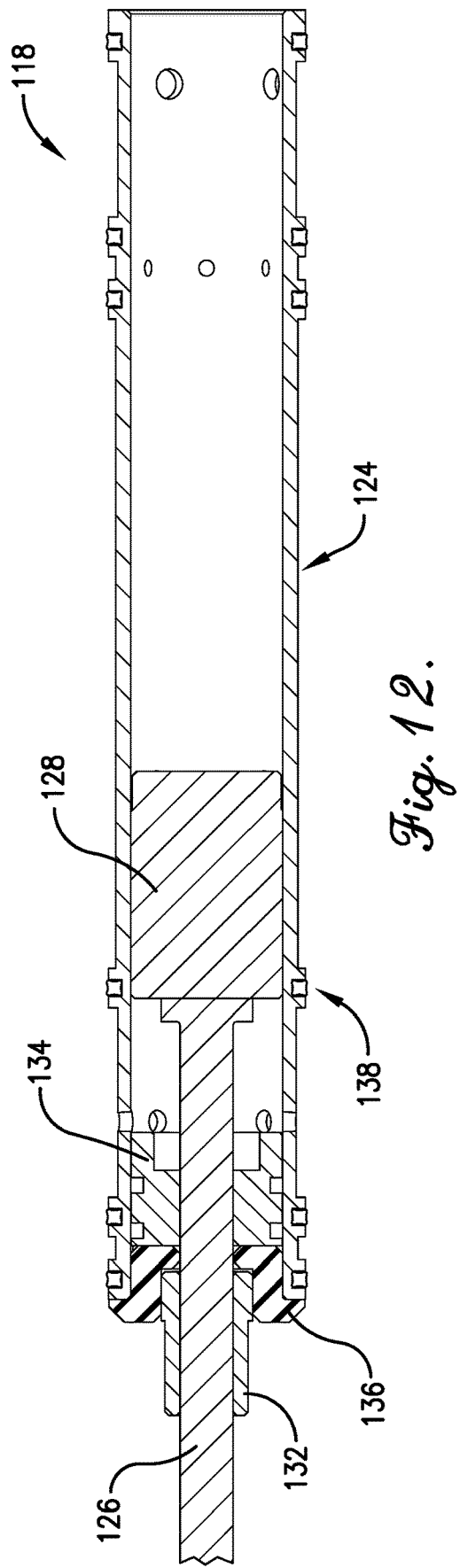

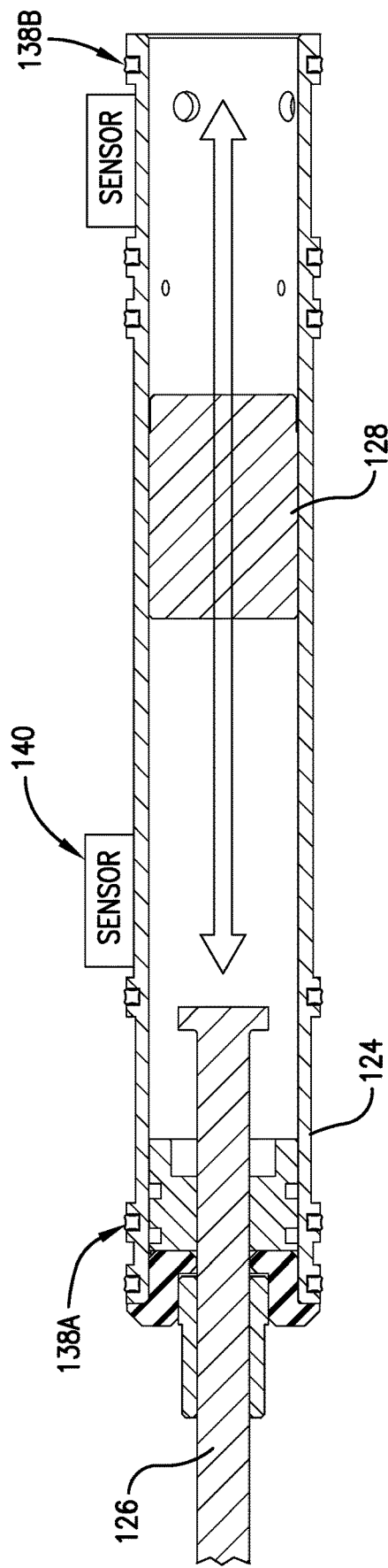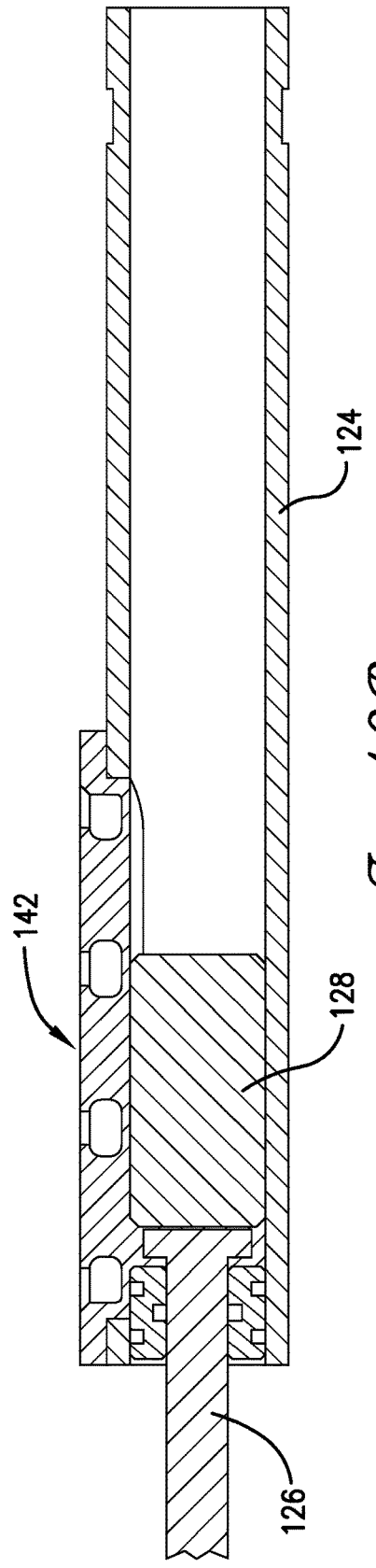
Fig. 13A.
Fig. 13B.

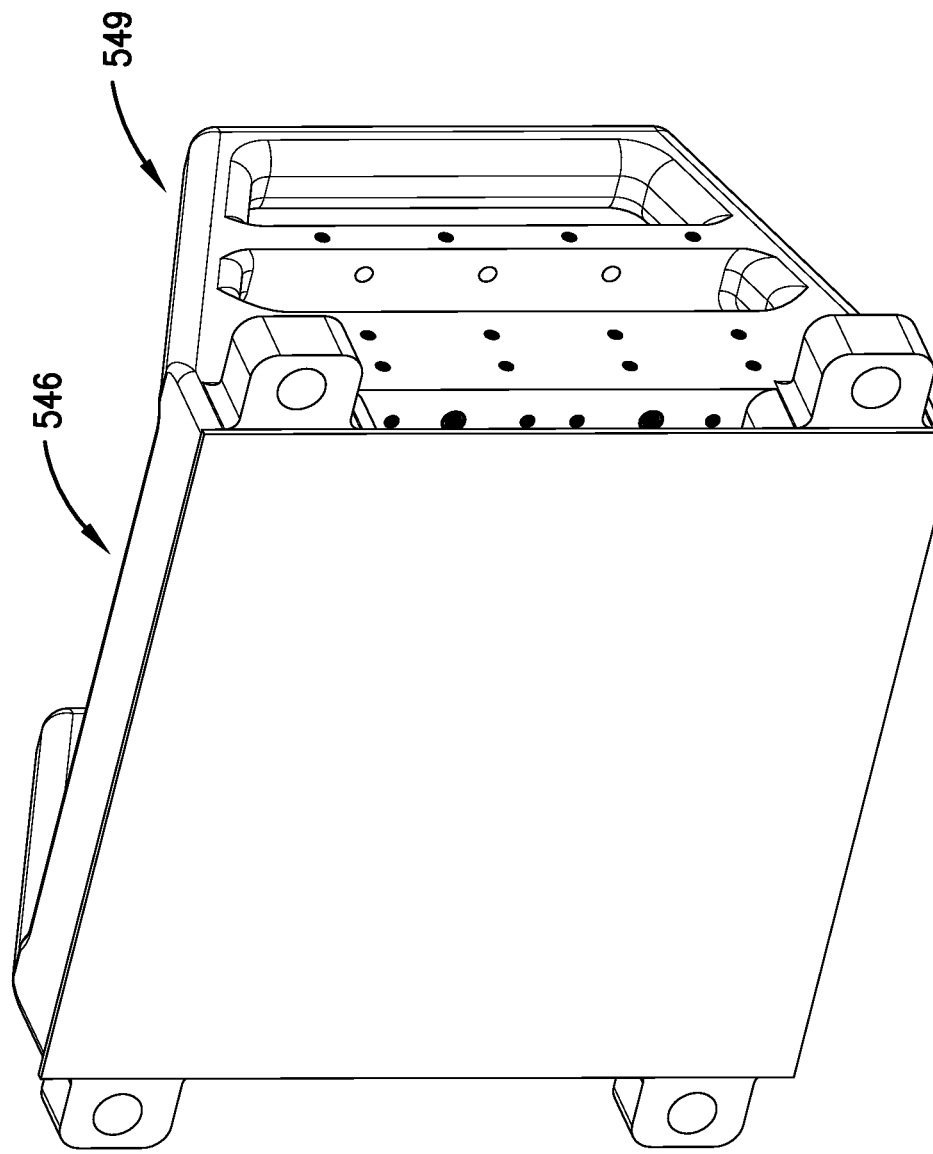

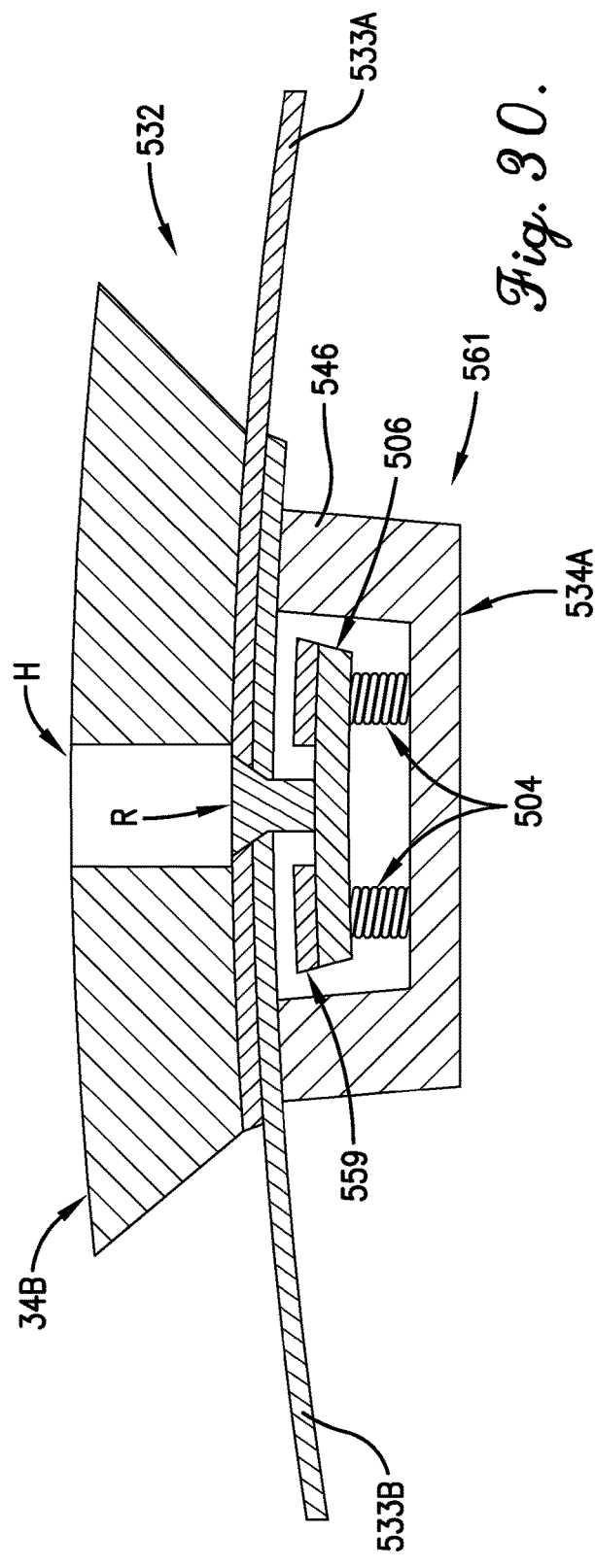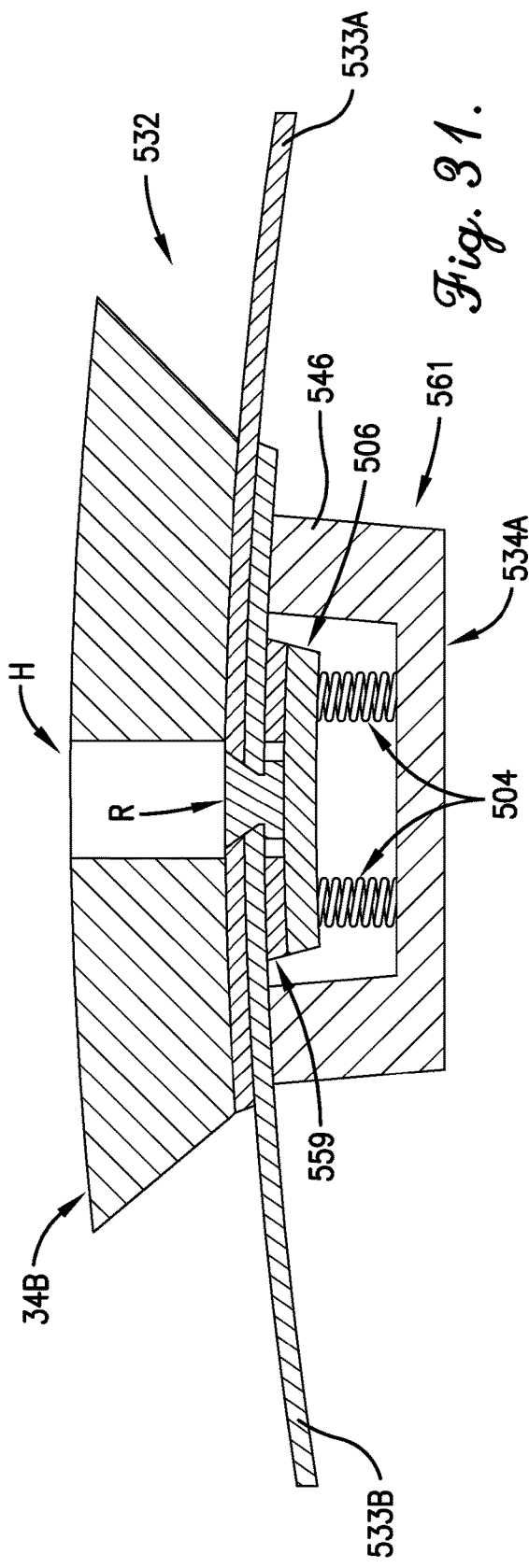

SYSTEM AND METHOD FOR DRILLING HOLES AND INSTALLING FASTENERS IN VEHICLE STRUCTURES

RELATED APPLICATIONS

The present U.S. non-provisional patent application is a continuation-in-part of an earlier-filed U.S. non-provisional patent application titled "System and Method for Drilling Holes and Installing Fasteners in Vehicle Structures," Ser. No. 16/718,493, filed Dec. 18, 2019. The entire content of the identified earlier-filed patent application is incorporated by reference as if fully set forth herein.

FIELD

The present invention relates to systems and methods for drilling holes and installing fasteners in vehicle structures, and more particularly, embodiments concern a system and method for drilling holes in aircraft fuselages or other aerospace or vehicle bodies or structures and delivering, sealing, inserting, and otherwise installing fasteners in the holes.

BACKGROUND

It is often desirable to install fasteners of various kinds in aerospace or other vehicle structures (e.g., fuselages or other bodies). Several technologies exist for accomplishing this task, but all suffer from different disadvantages. At one extreme, holes may be drilled by hand using simple tools, and fasteners may be installed in the holes by hand using simple tools. This provides a simple solution but increases the risks of creating defects or other errors with regard to drilling the hole incorrectly or installing the fastener incorrectly. Further, this solution can require a great deal of time and expense to train operators. At the other extreme, the processes of drilling holes and installing fasteners may be highly automated and performed by sophisticated machines. This solution greatly reduces the risks of creating defects or other errors, but is also much more complicated and expensive to implement and maintain.

This background discussion is intended to provide information related to the present invention which is not necessarily prior art.

SUMMARY

Embodiments address the above-described and other limitations and disadvantages in the prior art by providing a system and method for drilling holes in aircraft fuselages or other aerospace or vehicle structures or bodies and delivering, sealing, inserting, and otherwise installing fasteners in the holes. In particular, embodiments provide solutions that advantageously combine higher quality and lower cost relative to prior art technologies.

In an embodiment, a system is provided for drilling a hole in a vehicle structure and installing a fastener in the hole. The system may comprise a first drill plate, and the first drill plate may include a plate body, an opening, and a machine-readable element. The plate body may be temporarily attached to a first surface of the vehicle structure. The opening may extend through the plate body to the first surface of the vehicle structure. The machine-readable element may be associated with the opening and provide information regarding drilling the hole and installing the fastener in the hole. In operation, the opening may receive a drill gun which drills the hole in the first surface, and then the opening may receive a fastener insertion gun which installs the fastener in the hole.

In various implementations of the foregoing embodiment, the system may further include any one or more the following features. The plate body may be constructed of carbon fiber reinforced resin. The machine-readable element may be a radio-frequency identification element electronically communicating the information, or alternatively, communicating a code which may be used to obtain the information. The information may include hole information regarding how the hole is to be drilled, and the hole information may include a size of the drill bit for drilling the hole. The information may include fastener information regarding the fastener to be installed in the hole and how the fastener is to be installed in the hole, and the fastener information may include a type and a size of the fastener to be installed in the hole. There may be a plurality of openings and a single machine-readable element associated with the plurality of openings, or alternatively, there may be a plurality of openings and a plurality of machine-readable elements. The system may further comprise an electronic memory element recording whether the hole has been drilled and whether the fastener has been installed in the hole. The system may further comprise a second drill plate temporarily attached to a second surface of the vehicle structure and physically aligned with the first drill plate.

In another embodiment, a system is provided for drilling a hole in an aircraft body and installing a fastener in the hole. The system may comprise a drill plate, a drill gun, and a fastener insertion gun. The drill plate may include a plate body temporarily attached to a first surface of the aircraft body, an opening through the plate body extending to the first surface of the aircraft body, and a machine-readable element associated with the opening and providing fastener information regarding a required fastener to be installed in the hole. The drill gun may be inserted into the opening, drill with a drill bit the hole in the first surface, and then be removed from the opening. The fastener insertion gun may be inserted into the opening and install the fastener in the hole. The fastener insertion gun may include a fastener insertion gun reader element reading the fastener information.

In various implementations of the foregoing embodiment, the system may further include any one or more the following features. The fastener information may include a required fastener type and a required fastener size of the required fastener to be installed in the hole. The system may further include a computer which may compare the required fastener type and the required fastener size with an actual fastener type and an actual fastener size of the fastener in the fastener insertion gun, and may block the fastener insertion gun if the required fastener type and the required fastener size do not match the actual fastener type and the actual fastener size. The machine-readable element may further provide hole information regarding how the hole is to be drilled, wherein the hole information may include a required drill bit size for drilling the hole, and the drill gun may include a drill gun reader element reading the hole information. The computer may compare the required drill bit size with an actual drill bit size of the drill bit installed in the drill gun, and may block the drill gun if the required drill bit size does not match the actual drill bit size. The system may further include an electronic memory element recording whether the hole has been drilled and whether the fastener has been installed in the hole.

In another embodiment, a fastener insertion gun is provided for installing a fastener in a hole in a vehicle structure. The fastener insertion gun may comprise a gun body, a concentric collet, a reader mechanism, a plurality of internal air valves, and a gun computer. The gun body may have a forward portion and rearward portion. The concentric collet may be mounted on the forward portion of the gun body and may selectively expand within an opening adjacent to the hole in the vehicle structure to mechanically secure the fastener insertion gun during installation of the fastener. The reader mechanism may be associated with the forward portion of the gun body and may receive information from a machine-readable element associated with the hole in the vehicle structure. The plurality of internal air valves may be located within the gun body and may selectively provide pressurized air used to install the fastener. The gun computer may be housed within the gun body and may receive the information via the reader mechanism, load the fastener based on the information from the reader mechanism, and actuate one or more of the internal air valves to provide the pressurized air used to install the fastener.

In various implementations of the foregoing embodiment, the fastener insertion gun may further include any one or more the following features. The machine-readable element may be a radio-frequency identification element electronically communicating the information, or alternatively, communicating a code which may be used to obtain the information from a database. The information may include fastener information regarding the fastener to be installed in the hole, such as a type and a size of the fastener, and how the fastener is to be installed in the hole. The fastener insertion gun may further comprise a fastener supply tube connected to the gun body and delivering the fastener to the gun body from a fastener supply reservoir. The fastener insertion gun may further comprise a fastener feed window mounted through the gun body and allowing an operator of the fastener insertion gun to see the fastener within the gun body.

The fastener insertion gun may further comprise an impact mechanism applying an impact force to an end of the fastener, the impact mechanism including an impact tube including a forward port connected to a first internal air valve of the plurality of internal air valves and a rearward port connected to a second internal air valve of the plurality of internal air valves; an impact rod moving forwardly within the impact tube to apply the impact force to the end of the fastener, and moving rearwardly to reset; an impact mass moving forwardly within the impact tube to strike the impact rod, and moving rearwardly to reset; and the gun computer controlling the first and second internal air valves so as to move the impact rod and the impact mass forwardly and rearwardly by selectively introducing the pressurized air into the impact tube via the forward and rearward ports.

The impact mechanism may further include forward and a rearward first inductive sensors detecting a location of the impact mass within the impact tube, and the gun computer receiving the location of the impact mass from the forward and rearward first inductive sensors and controlling the first and second internal air valves based on the location of the impact mass within the impact tube. The impact mechanism may further include a plurality of forward second inductive sensors detecting a location of the impact mass at the forward end of the impact tube, and the gun computer determining when the fastener is fully seated in the hole based on the location of the impact mass at the forward end of the impact tube. The impact mechanism may further include one or more variable pressure regulators controlling the pressure of the pressurized air entering the impact tube through the forward and rearward ports, and the gun computer controlling the one or more variable pressure regulators to change the impact force applied to the end of the fastener by the impact rod. The impact mechanism may further include a rod and mass retractor moving rearwardly to reset the impact rod and the impact mass; a bumper at a forward end of the impact tube and absorbing a remaining portion of the impact force of the impact rod; and a bushing at the forward end of the impact tube and through which the impact rod moves to reduce wear.

The fastener insertion gun may further comprise a sealant dispensing module comprising a cartridge containing a sealant, the sealant dispensing module selectively applying the sealant to the fastener prior to installation, and the gun computer controlling the selective application of the sealant. The fastener insertion gun may further comprise a display mechanism mounted on the gun body and visually communicating operation information from the gun computer to an operator of the fastener insertion gun; and an operator interface mounted on the gun body and facilitating an input of operation information from the operator of the fastener insertion gun to the gun computer.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 10 is a cross-sectional elevation view of an impactor subcomponent of the fastener insertion gun of FIG. 7, wherein the impactor is shown in a retracted position;

FIG. 11 is a cross-sectional elevation view of the impactor of FIG. 10, wherein the impactor is shown in an intermediate position;

FIG. 12 is a cross-sectional elevation view of the impactor of FIG. 10, wherein the impactor is shown in a forward position;

FIG. 13A is a cross-sectional elevation view of an implementation of the impactor of FIG. 11 showing first inductive sensors for controlling impact cycles;

FIG. 13B is a cross-sectional elevation view of an implementation of the impactor of FIG. 11 showing second inductive sensors for determining fastener height;

FIG. 29 is a perspective view of a first side of the tool of FIG. 28;

FIG. 30 is a fragmentary cross-sectional elevation view of the tool of FIG. 20 positioned to secure a rivet fastener;

FIG. 31 is a fragmentary cross-sectional elevation view of the tool of FIG. 20 securing the rivet fastener in the vehicle structure.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system and method for drilling holes in aircraft fuselages or other aerospace or vehicle bodies or structures and delivering, sealing, inserting, and otherwise installing fasteners in the holes. Embodiments provide solutions that advantageously combine higher quality and lower cost relative to the prior art, and that may advantageously reduce defects associated with improper hole drilling or fastener installation by ninety percent. This is achieved by a combination of smart drill plates protecting the surfaces of the bodies or other structures and identifying proper drilling and fastener parameters, smart drilling guns, smart fastener insertion guns, and an overarching quality control mechanism. Operators no longer need to memorize such information as hole diameters, fastener types, and grip lengths for hundreds or thousands of locations on the bodies, so training time may be reduced from several months to one week.

Figure 1:
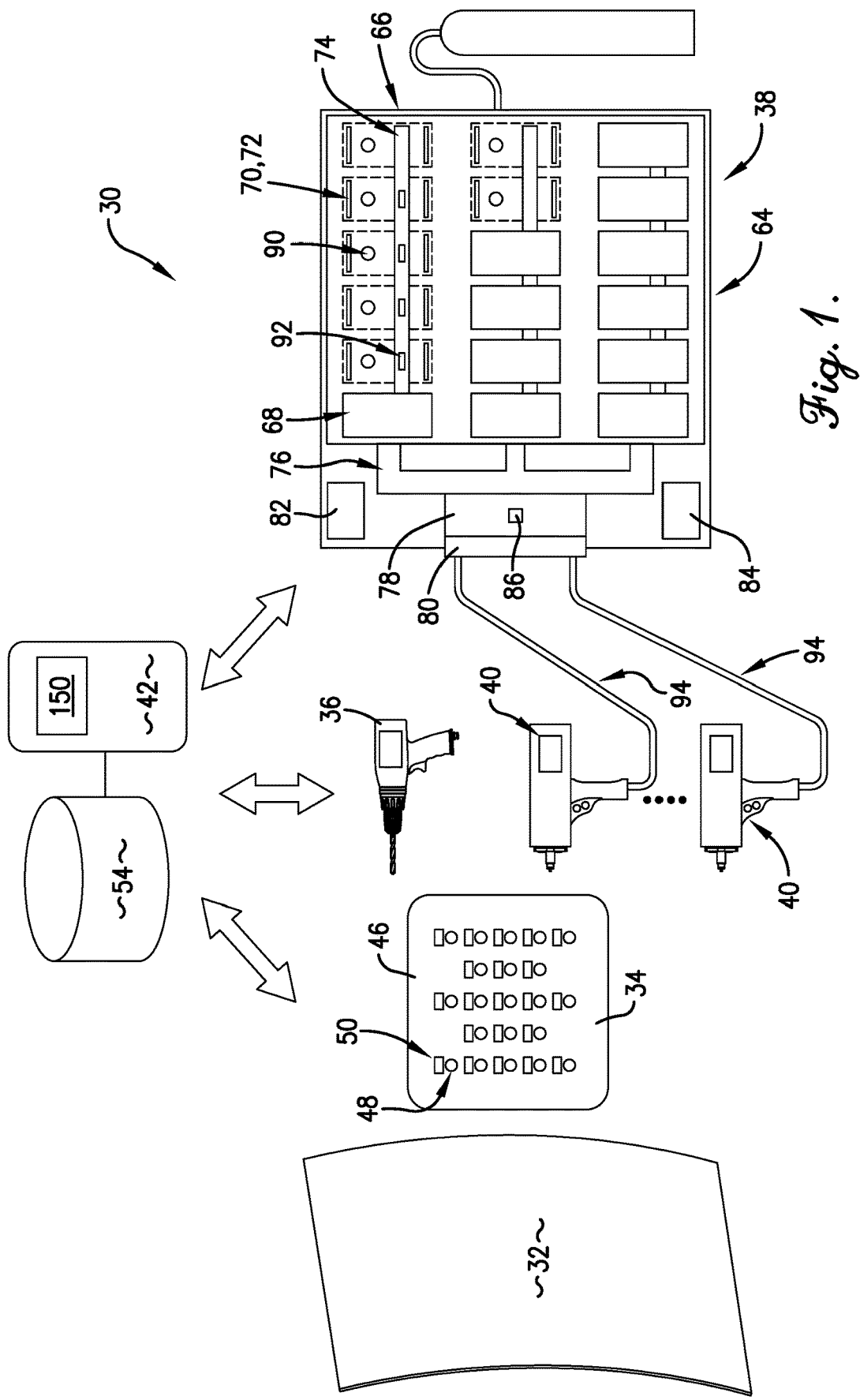
FIG. 1 is a high-level depiction of an embodiment of a system for drilling a hole in a vehicle structure and installing a fastener in the hole, wherein the system includes a drill plate, a drill gun, a fastener delivery subsystem, and a fastener insertion gun.

Referring to FIG. 1, an embodiment of a system 30 is shown configured to drill holes and deliver, seal, insert, and otherwise install fasteners in the holes in aircraft fuselages or other aerospace or vehicle bodies or structures 32. The system 30 may include some or all of one or more drill plates 34, a drill gun 36, a fastener delivery subsystem 38, a fastener insertion gun 40, and a system computer 42.

Figure 2:
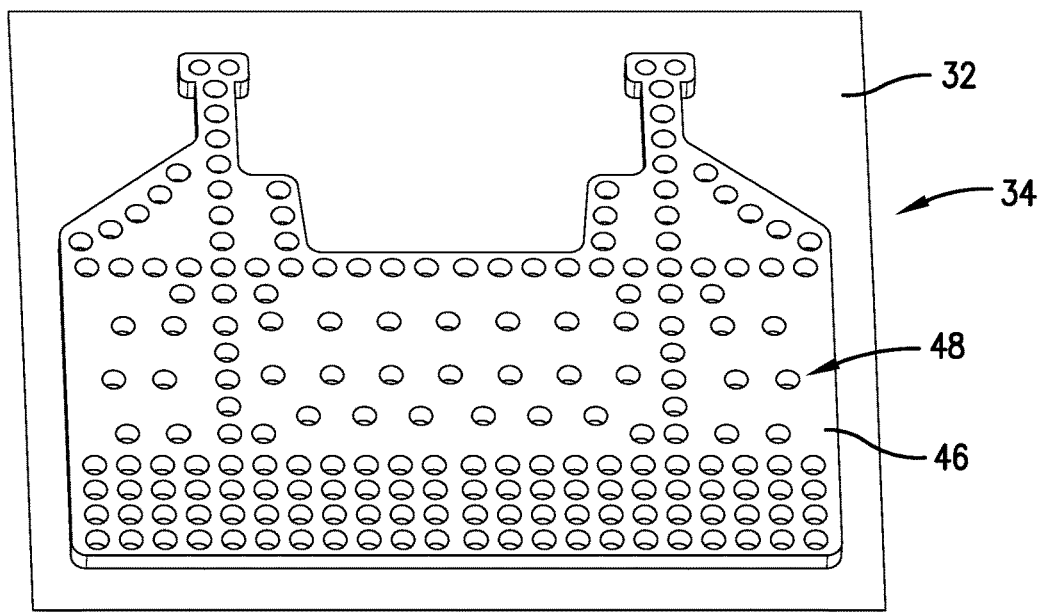
FIG. 2 is a plan view of an implementation of the drill plate component of the system of FIG. 1 positioned on the vehicle structure.
Figure 3:
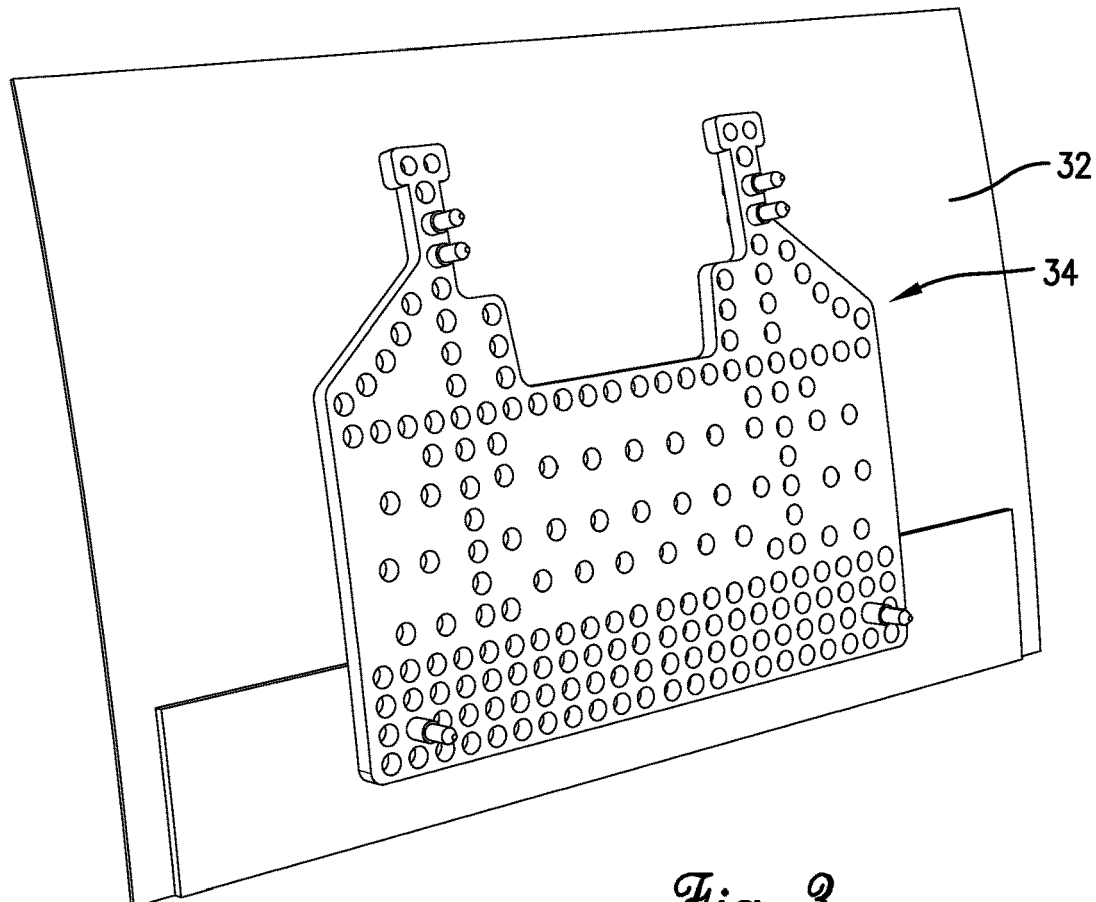
FIG. 3 is an isometric view of the drill plate of FIG. 2 shown positioned on the vehicle structure.

Referring also to FIGS. 2 and 3, the one or more drill plates 34 may be configured to temporarily attach to or otherwise physically position on the structure 32 and inform and physically guide the operation of the drill gun 36 in drilling the holes in the structure 32 and inform and physically guide the operation of the fastener insertion gun 40 in installing the fasteners in the holes. In one implementation, each drill plate 34 may include a plate body 46, one or more openings 48 through which the holes may be drilled and the fasteners installed, and one or more machine-readable elements 50 associated with the openings 48.

The plate body 46 may have substantially any suitable shape desired or needed to fulfill its function, may be constructed from substantially any suitable material, such as carbon fiber reinforced resin or aluminum, and may be constructed using substantially any suitable technology, such as three-dimensional printing or computer-controlled milling technologies. For at least some applications, three-dimensional printing may allow for reduced cost, assembly, maintenance, size, and weight. The plate body 46 may be physically positionable on a location on the structure 32 to avoid damage to the surface of the structure that might otherwise occur during the drilling and fastener installation process. The plate body 46 may be temporarily attachable to the structure 32 using substantially any suitable technology, such as a hole locating/mapping convention with bushings and mechanical mechanisms (e.g., WedgeLocks™) to resist loosening. The plate body 46 may present the one or more openings 48 extending through the plate body 46 and through which the holes may be drilled and the fasteners installed in the structure 32. As desired or needed for particular applications, the openings 48 may have relatively close tolerances.

The one or more machine-readable elements 50 may be configured to store and communicate information relevant to drilling the holes and installing the fasteners. Such information may include a size of a drill bit; a speed of the drill; a type, size, or grip length of a fastener; a drill feed by stack material; whether coolant should be used; a hammer time; and whether sealant should be applied. The machine-readable elements 50 may employ substantially any suitable machine-readable technology. Although generally described herein as being radio-frequency identification (RFID) elements, the machine-readable elements may alternatively be, for example, readable barcodes or quick response (QR) codes.

The RFID elements 50 may be embedded into or applied to a surface of the plate body 46 proximate to the openings 48. The actual distance between an RFID element 50 and its corresponding opening 48 may depend on such factors such as the strength of the RF signal. In one implementation, each opening may be associated with its own RFID element, while in another implementation, several or all of the openings may be associated with a single RFID element. As discussed in more detail below, other elements of the system 30, such as the drill gun 36 and the fastener insertion gun 40 may include reader mechanisms configured to read the information stored on the RFID elements 50, and may use that information to ensure that the drilling and installation processes are performed without error. In one implementation, the information may be stored on the RFID element 50, while in another implementation, the information may be stored in an electronic memory element 54 and the RFID element 50 may provide an identification code (e.g., a twenty-four bit alphanumeric identifier) which can be used to electronically access the information from the electronic memory element 54. In one implementation, the RFID element 50 may be further configured to determine, through electronic interaction with the drill gun 36 and the fastener insertion gun 40, whether a hole has been drilled and whether a fastener has been installed through each opening 48, and that information may be stored in the electronic memory element 54.

In one implementation, each RFID element 50 may include a transmitter and an integrated antenna and each reader mechanism 56,110 may include a receiver and an integrated antenna, while in another implementation, both the RFID elements 50 and the reader mechanisms 56,110 may include transceivers and integrated antennas for bidirectional communication. The transmission power, antenna design, and other aspects of the RFID elements 50 and reader mechanisms 56,110 may be optimized for particular applications. In one example application, the transmission power and antenna design of the reader mechanisms 56,110 may be optimized to read RFID elements 50 within approximately twelve millimeters of an opening 48 in any direction. If the openings 48 are in close proximity to each other, a particular RFID element 50 may be readable from several different opening locations. In one implementation, if a reader mechanism reads more than one RFID element 50 from a particular opening, then the system 30 may determine which opening 48 correlates most strongly with the group of RFID elements 50 and proceeds based on the information from the electronic memory element 54.

Figure 5A:
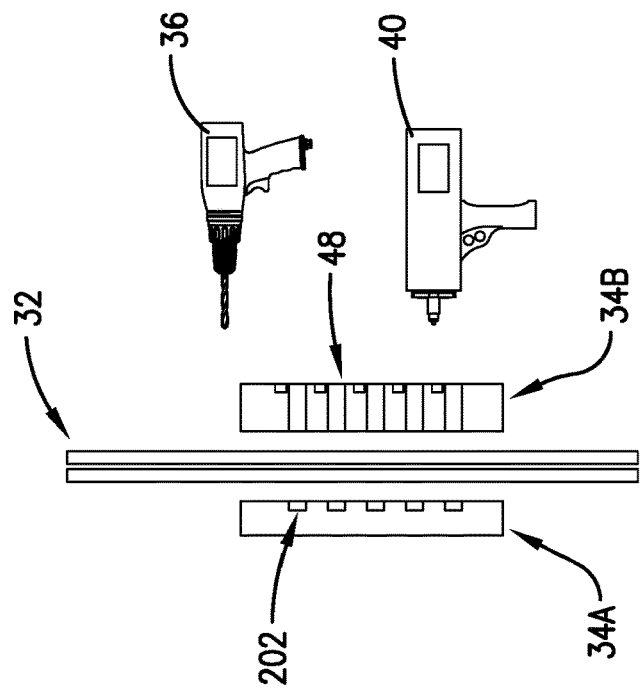
FIG. 5A is a cross-sectional elevation view of a first version of the implementation of FIG. 4.
Figure 4:
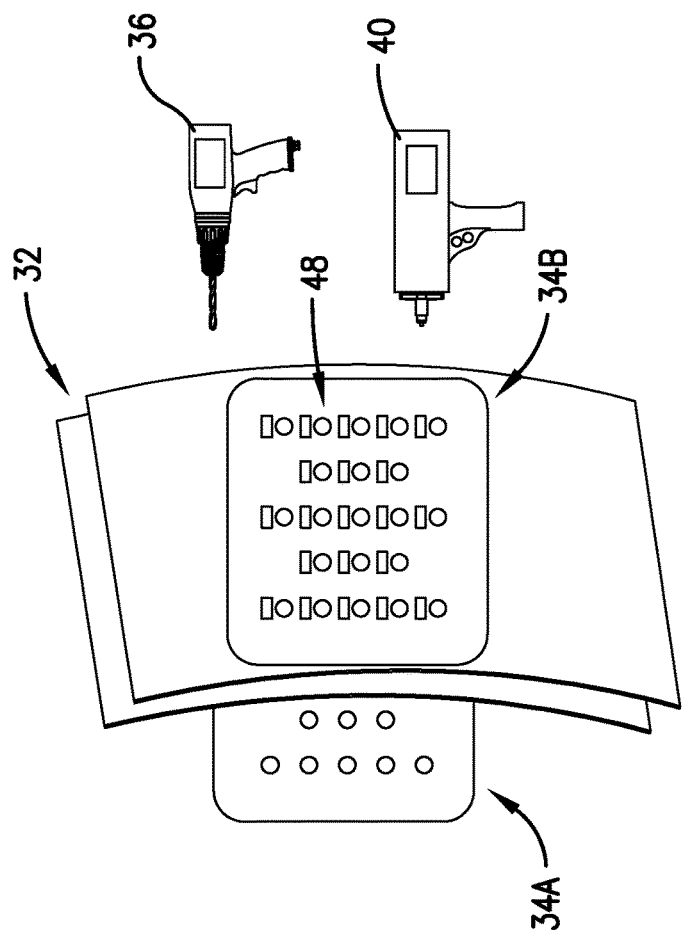
FIG. 4 is an isometric view of an implementation of the system of FIG. 1 involving multiple drill plate components.
Figure 5C:
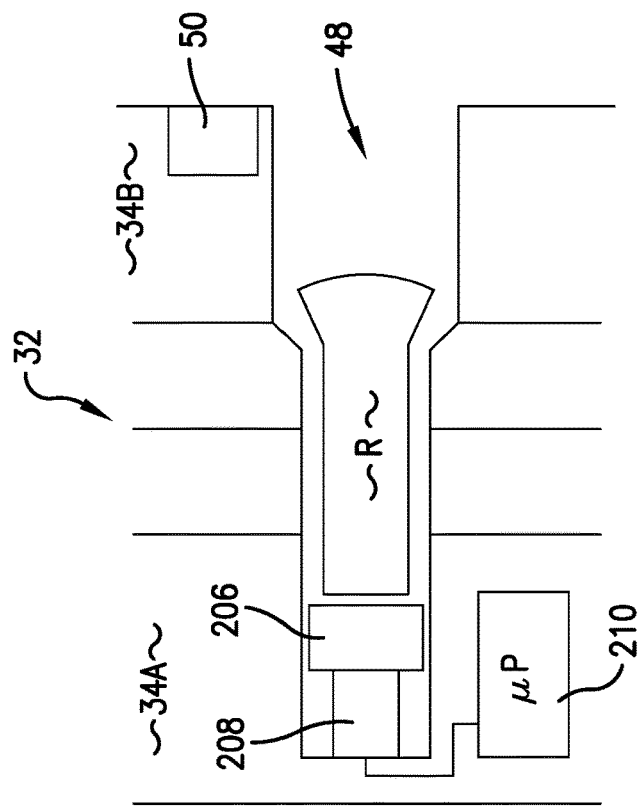
FIG. 5C is a cross-sectional elevation view of a third version of the implementation of FIG. 4.

Referring also to FIGS. 4-5C, in another embodiment, the system 30 may employ two drill plates 34A,34B for each hole and fastener. More specifically, the structure 32 may have multiple layers, and a first drill plate 34A may be positioned on a first surface (e.g., an interior) of the multi-layered structure 32, and a second drill plate 34B may be positioned on a second surface (e.g., an exterior) of the multi-layered structure 32, such that the first and second plates 34A,34B are aligned with each other. The first and second plates 34A,34B may then be fastened together through the structure 32, or otherwise temporarily secured in place on the structure 32, in such a manner as to compress and clamp the multiple layers of the structure 32 together so as to facilitate more accurately drilling the hole and inserting the fastener through the multiple layers.

In a related embodiment, the system 30 may employ the two drill plates 34A,34B for each hole and fastener, wherein the fastener is a rivet. More specifically, the first drill plate 34A may be positioned on the first surface of the structure 32 (which may have one or multiple layers), and a second drill plate 34B may be positioned on the second surface of the structure 32, such that the first and second plates 34A,34B are aligned with each other. The first and second plates 34A,34B may then be fastened together through the structure 32, or otherwise temporarily secured in place on the structure 32.

Riveting aerospace structures presents particular challenges. The prior art process is entirely manual and requires two technicians, one on each side of the structure. One technician selects and inserts the appropriate rivet, and then uses a rivet hammer with an appropriate set to form the rivet. The other technician uses a bucking bar to provide a surface to form the rivet as the hammer is working. This requires the two technicians to be aware of and synchronized with each other's actions to avoid skin quality defects.

In one embodiment, an improved manual process is provided which may use the above-described drill plates 34A,34B and wherein drilling and countersinking may be performed by drills that automatically drill holes and set countersinks in the structure 32. The drill plates 34A,34B advantageously protect the skin and precisely locate the holes.

A placement device may be used to facilitate placing a rivet R in the hole while the drill plate 34B is attached. In one implementation, the placement device may be a bushing which is a slip fit into the opening 48 in the drill plate 34B. The placement device may have an inner diameter which is approximately the same size as the rivet R, thereby allowing the rivet R to travel through the drill plate 34B to the countersunk hole without flipping or turning. In another implementation, the placement device may have one or more fingers that grip and constrain the rivet R, thereby allowing for manual placement of the rivet R into the hole.

A rivet set may be used which is turned to a diameter that is a slip fit to the openings 48 in the drill plate 34B, and which is compatible with the rivet hammer. The openings in the drill plate 34B may align the rivet set directly on top of the rivet R as it sits in the structure 32. This advantageously constrains the rivet hammer during its impact cycle, thereby improving skin quality by reducing defects of off-center, mis-aligned, or out of control rivet hammers that can cause skin indentations, scratching, or improperly set rivets.

In one implementation, which may involve only the outer drill plate 34B, a second technician on the opposite side of the structure 32 may use a substantially conventional bucking bar in synchronicity with the first technician setting the rivets. In another implementation, seen in FIG. 5A, the inner drill plate 34A may be used for bucking each rivet R, which may advantageously reduce or eliminate the need for the second technician. The inner drill plate 34A may be positioned on the opposite side of the structure 32 from the outer drill plate 34B, and may be configured to provide the reaction force required to form the rivet R. The inner drill plate 34A may perform the function of the bucking bar, thereby advantageously allowing a single technician to install rivets while reducing the number of skin quality defects. Further, use of the drill inner plate 34A reduces or eliminates the impacts routinely absorbed by the second technician.

The inner drill plate 34A may take substantially any suitable form, including a thin metal (e.g., aluminum or steel) plate with pocketed forming areas 202 at locations where rivets are to be placed. At each such location, the inertia of the inner drill plate 34A provides the reaction forces against the impact of the rivet hammer to form the rivet R.

Figure 5B:
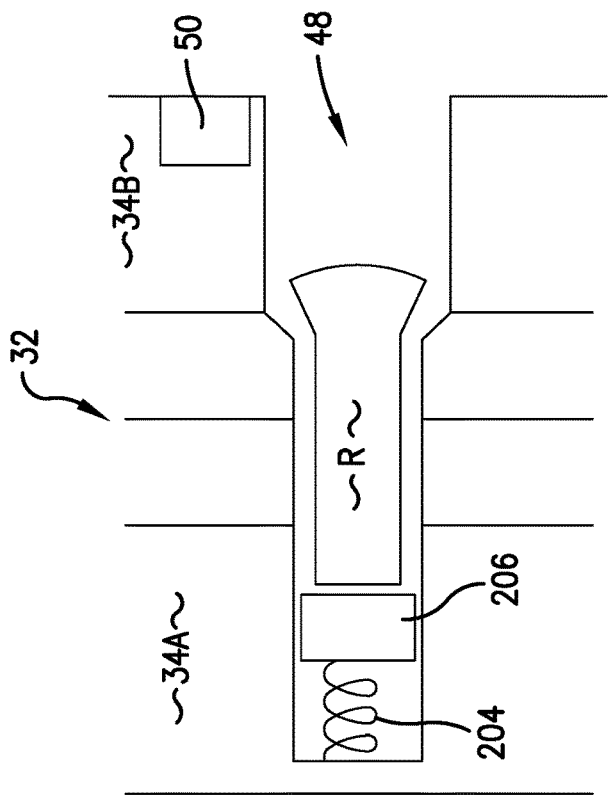
FIG. 5B is a cross-sectional elevation view of a second version of the implementation of FIG. 4.

Referring to FIG. 5B, in another implementation, the inner drill plate 34A may take the form of a three-dimensionally printed or machined plate which has a spring-loaded mass over each location where a rivet R is to be place. The spring 204 and the mass 206 may be tuned to the impact rate to ensure contact with the rivet R at each impact of the hammer. This may be accomplished by assuming a vibrating system with a single degree of freedom wherein the natural frequency of the system is adjusted by modifying the spring 204 or the mass 206. The springs 204 may be sheet metal cut and folded to provide an initial pretension, and the masses 206 may be attached to the flanges of the sheet metal and act as a forming surface for the rivet R.

Referring to FIG. 5C, in a related implementation, rather than being associated with a spring, each mass 206 may be associated with an actuator 208. The mass 206 may act as the forming surface of the rivet R, and the actuator 208 may provide the desired or required contact force. In one version, the actuator 208 may be a pneumatic actuator configured to apply a nominal force as well as pneumatic spring effects. The air pressure and the mass 206 may be varied to maintain contact between the mass 206 and the rivet R during impacting. In another version, the actuator 208 may be a hydraulic actuator, and the mass 206 and its associated actuator location may be hydraulically coupled. This allows the forming surface to be semi-rigidly force-coupled with the surrounding masses wherein the movement of one mass transfers the force/motion to its surrounding masses. This may advantageously reduce weight and complexity in comparison with the pneumatic version.

In another embodiment, a semi- or fully-automated process is provided which may use the above-described drill plates 34A,34B. Broadly, the process involves a hand-held rivet insertion gun (such as the fastener insertion gun 40, described below) which a technician can lock into the drill plate 34B and with the push of a single button (1) identify the hole and the type of desired or required rivet, (2) call for that rivet from a fastener supply system (such as the fastener delivery subsystem 38, described below), (3) receive and load the rivet and place it into the hole, and (4) form the rivet through multiple impacts.

In one implementation, the rivet insertion gun 40 may be configured to mimic the impact cycles of a rivet set for use with aluminum and titanium rivets. Some or all of the operations of the rivet insertion gun 40 may be electronically controlled to accommodate one or more of the following bucking technologies. In one implementation, the rivet insertion gun 40 may be secured in the drill plate 34B using a concentric collet 112. This allows for greater control of the forces being applied directly on the rivet R, which facilitates repeatable forming of the rivet R through a number of impacts or a duration of constant impacting based on the rivet diameter and grip length.

A modified bucking bar may be integrated into a control system (such as the system computer 42 or the fastener insertion gun computer 98, both of which are described below) to provide a signal when in contact with the rivet R. This signal can be used in conjunction with the rivet insertion gun 40 to provide synchronized feedback indicating when to begin the impacting process. Alternatively, the inner drill plate 34A may function as an inner bucking plate allowing the rivet R to be formed at any hole. In another implementation, electronically activated impact modules 118 (described below), 206/208 (described above) on both sides of the rivet R may be coordinated to simultaneously impact the rivet R. The drill plates 34A,34B and the rivet insertion gun 40 may identify the hole and call for the desired or required rivet R. The inner drill plate 34A may be configured similar to the above-described outer drill plate 34B with lockable bushings. Because the impact module 118 of the rivet insertion gun 40 is fully programmable through electronic valving, the impact modules 118,206/208 on each side of the rivet R may be synchronized and impact simultaneously or at programmed offsets. This advantageously provides increased control in forming the rivet R and increased quality as forces act on the rivet from opposing sides rather than into the structure itself.

In operation, the inner and outer drill plates 34A,34B and respective first and second technicians may be positioned on opposite sides of the structure 32. The rivet insertion gun 40 may be positioned on the outer drill plate 34B and may read an RFID element 50 associated with each hole, call for the desired or required rivet R, and place the rivet R in the hole. The second standalone impact module 206/208 may be positioned on the inner drill plate 34A and may be electronically synchronized with the rivet insertion gun 40. Impact parameters may be loaded for the particular rivet to both the gun computer 98 of the rivet insertion gun 40 and a module computer 210 of the second impact module 210. The computers 98,210 may be synchronized and begin impacting cycles in synchronicity with each other so as to impact the rivet R simultaneously or at programmed offsets to form the rivet R.

Figure 6:
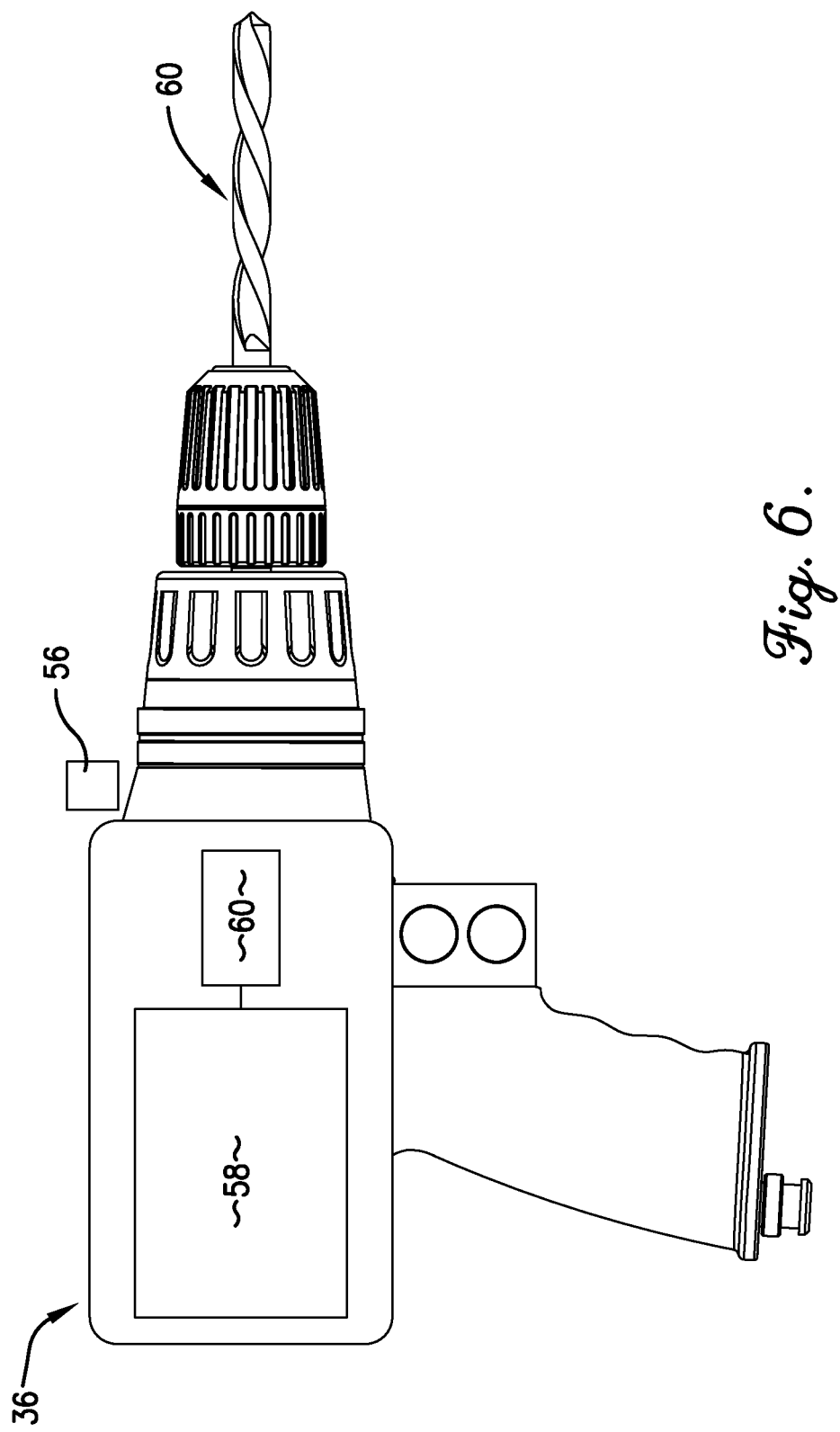
FIG. 6 is a side elevation view of the drill gun component of the system of FIG. 1.
Figure 7:
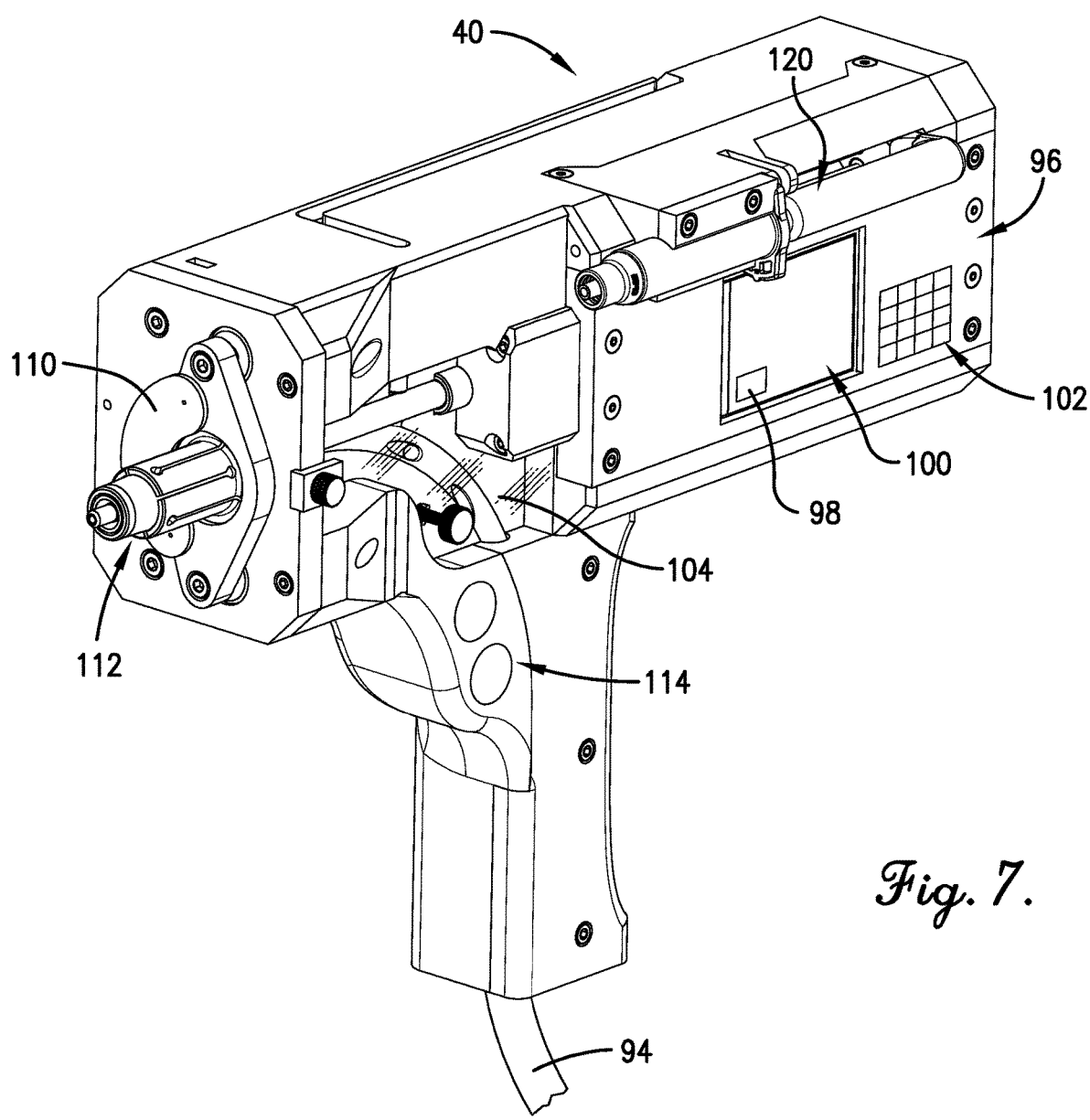
FIG. 7 is a first fragmentary broken isometric view of the fastener insertion gun component of the system of FIG. 1.
Figure 8:
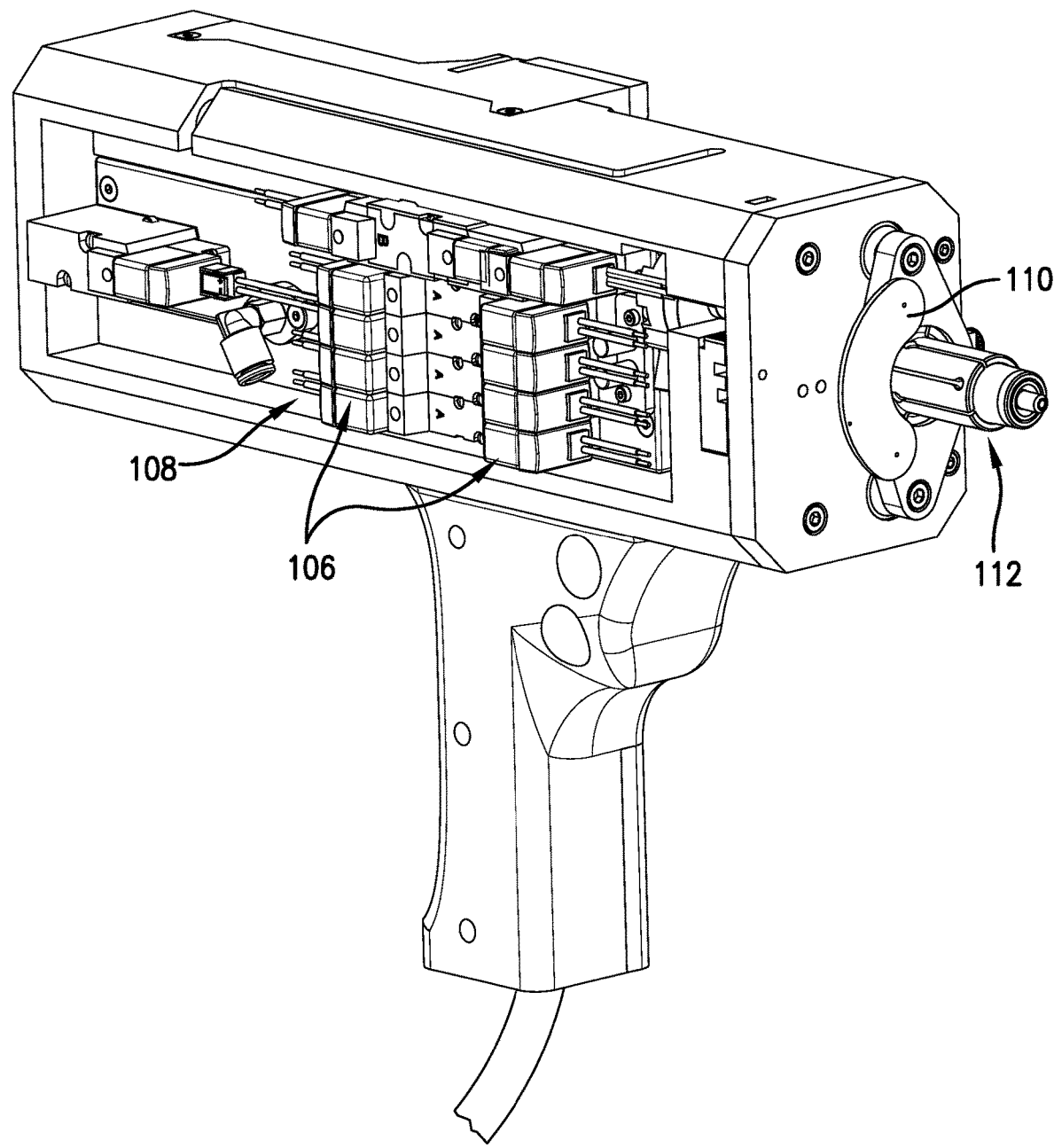
FIG. 8 is a second fragmentary broken isometric view of a fastener insertion gun of FIG. 7.
Figure 9:
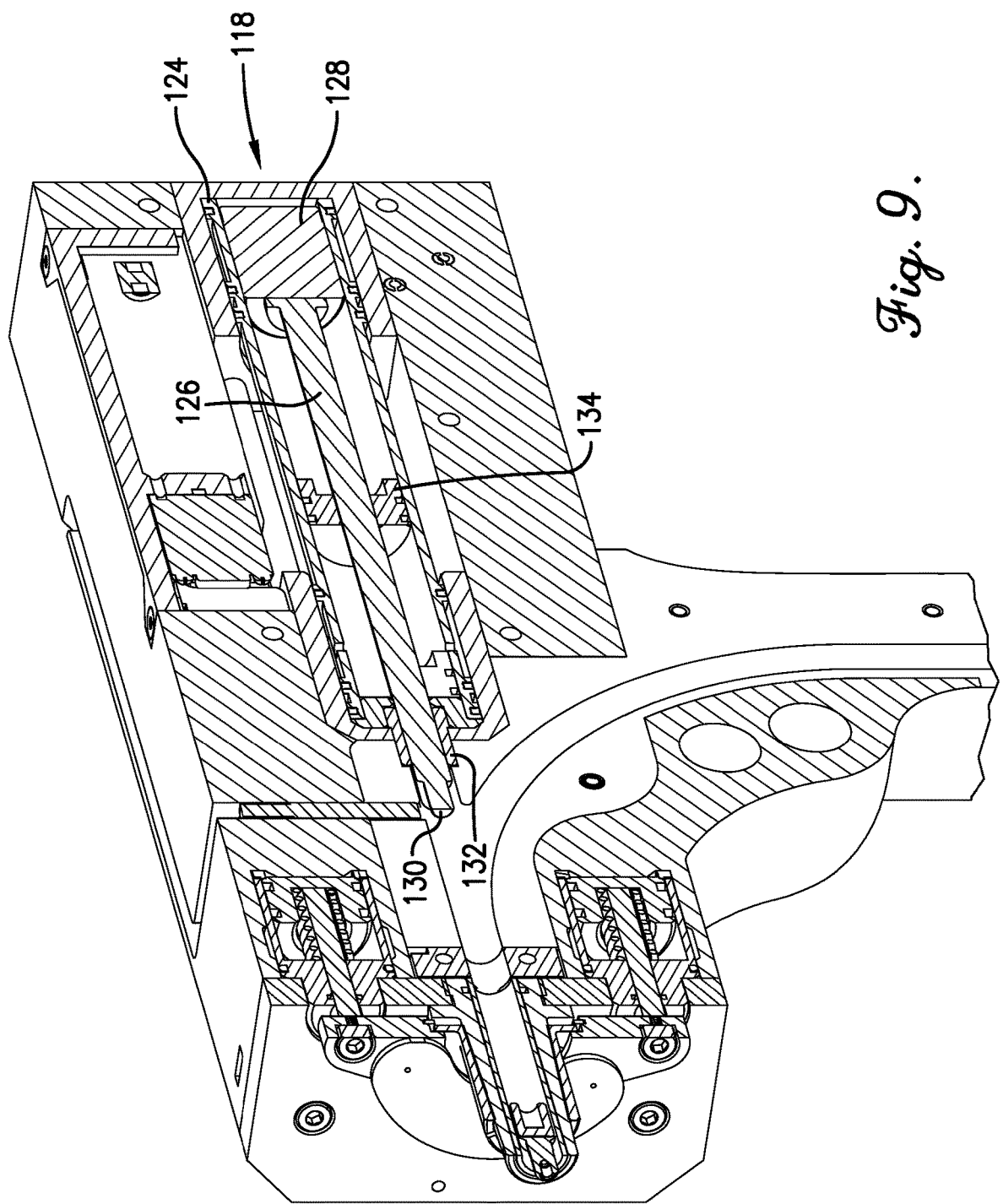
FIG. 9 is a cross-sectional isometric view of the fastener insertion gun of FIG. 7.

Referring also to FIG. 6, the drill gun 36 may be configured to cooperate with the drill plate 34 to drill the holes in the structure 32 to receive the fasteners. In one embodiment, the drill gun 36 may be substantially conventional in design and operation except as otherwise described herein.

In one embodiment, the drill gun 36 may include a drill gun reader mechanism 56, a drill gun display 58, and a drill gun computer 60. The drill gun reader mechanism 56 may be configured to read the hole information stored on the RFID element 50 associated with the openings 48 holes in the drill plate 34, and based on the hole information, determine the size, depth, and other relevant characteristics of the hole to be drilled. The drill gun display device 58 may be configured to display the hole information or other relevant information for consideration by an operator of the drill gun 36. In one implementation, the drill gun computer 60 may be configured to compare the hole information with the set-up of the drill gun 36 (e.g., the installed drill bit 60, the set depth of drilling) and to automatically shut-off or otherwise block the drill gun 36 if the hole information is not correctly reflected in the set-up of the drill gun 36, thereby avoiding errors in drilling the hole. In another implementation, this function may be performed by the system computer 42 in communication with the drill gun 36.

Referring again to FIG. 1, the fastener delivery subsystem 38 may be configured to store, track, and deliver the fasteners to the fastener insertion gun 40. In one implementation, the fastener delivery subsystem 38 may be configured to manage and supply fasteners of multiple diameters and grip lengths to the fastener insertion gun 40 as desired or needed. In one implementation, the fastener delivery subsystem 38 may be configured to deliver fasteners to multiple installation locations (i.e., to multiple fastener insertion guns 40). In one implementation, the fastener delivery subsystem 38 linked to the fastener insertion guns 40 may be configured to deliver and wet install approximately 5,000 hi-lok fasteners per hour. To meet this throughput rate, there may be eighteen fastener insertion guns 40 connected to the fastener delivery subsystem 38. Each fastener insertion gun 40 attached to the fastener delivery subsystem 38 may be capable of calling, receiving, and installing a fastener within six seconds.

An embodiment of the fastener delivery subsystem 38 may include a cabinet 64, a rack 66, one or more fastener cassettes 68, a pneumatic cassette union 70 and locking mechanism 72, a rail 74, an integrator 76, a diverter 78, a booster 80, a display device 82, and a fastener delivery subsystem computer 84. In one implementation, the fastener subsystem may further include one or more sensors 86 located in or throughout the fastener delivery subsystem 38 to monitor the positions of the fasteners as they travel from the fastener cassettes 68 to the fastener insertion gun 40.

The cabinet 64 may be configured to house one or more (e.g., approximately between two and four, or three) racks 66, and each rack 66 may be capable of holding the one or more (e.g., approximately between fifteen and twenty, or eighteen) cassettes or other fastener supply reservoirs 68. The cassettes 68 may be existing commercially available cassettes or modified or custom-designed technology. In one implementation, each cassette may include an RFID or other machine-readable element configured to store and communicate cassette information regarding the fastener cassette and its contents. In one implementation, the cabinet 64 may house or connect to all of the other components and controls for the fastener delivery sub system 38.

When a cassette 68 is loaded into a rack 66 it may engage the pneumatic cassette union 70. The pneumatic cassette union 70 may be configured to supply pressurized air to the cassettes 68. The lock mechanism 72, which may include a latch component, may be integrated into the pneumatic cassette union 70 to engage the cassette 68 and prevent it from being removed without the operator requesting its release from the fastener delivery subsystem computer 84. This function facilitates the fastener delivery subsystem computer 84 accurately tracking the quantities and types of fastener cassettes loaded into the cabinet 64. A proximity sensor 90 may be integrated into each cassette location in order to confirm that a cassette 68 is loaded or not loaded at that location.

The rail 74 may include a reader mechanism 92 configured to read the cassette information from the RFID or other machine-readable elements on the cassettes 68, and report the cassette information to the fastener delivery subsystem computer 84 which may store, track, and report the cassette information. The rail 74 may be further configured to cooperate with the lock mechanism 72 in locking and unlocking the cassettes 68. In one implementation, a pneumatic cylinder may be incorporated into the rail 74, wherein the pneumatic cylinder extends or otherwise actuates to open the lock mechanism 72. When the lock mechanism 72 is released, an ejector mechanism (e.g., one or more additional pneumatic cylinders) may extend or otherwise actuate to release the cassette 68 from the pneumatic cassette union 70. This function allows an operator to visually identify which cassette has been released, and also makes it easier to remove the released fastener cassette from the rack 66.

The integrator 76 may be configured to receive fasteners from the output of each cassette 68, and to integrate the outputs of all of the cassettes 68 into a common stream and deliver it to the diverter 78. The diverter 78 may be configured to receive the stream of fasteners from the integrator 76 and direct individual fasteners to one or more outputs, with each output leading to one of the fastener insertion guns 40. The diverter 78 may be directly driven by a servo motor. A ring sensor may be used to validate that a fastener has passed the through the output. A signal from the ring sensor may activate the booster 80 which may be configured to pneumatically accelerate the fastener to a minimum speed (e.g., approximately between forty and eighty feet per second, or approximately fifty-eight feet per second). The signal from the ring sensor may also indicate to the diverter 78 to process the next fastener in the stream. When the fastener is detected in the fastener insertion gun 40, the booster 80 may turn off.

The outputs of the diverter 78 may be directly attached to the fastener insertion guns 40 through fastener supply tubes 94. The tube lengths may be substantially any desired or needed length (e.g., one hundred feet or more in some cases), so the velocity of the fastener may be a factor in achieving a desired fastener installation time (of, e.g., approximately between three and nine seconds, or six seconds).

Any surfaces of the diverter 78 that experience a relatively higher degree of wear may be designed to be quickly and easily replaceable.

The display device 82 may be configured to display cassette and fastener information for consideration by an operator of the system 30. In one implementation, the fastener delivery subsystem computer 84 may be configured to monitor the availability of fasteners and the movement of the fasteners through the fastener delivery subsystem 38, and to automatically shut-off or otherwise block the delivery of fasteners if a needed fastener is not available of if there is an issue with the movement of fastener. In another implementation, this function may be performed by the system computer 42. If a shut-off or other block occurs, the reason for the shut-off or other block may be communicated via the display device 82 to facilitate rectifying the problem.

Referring also to FIGS. 7-16, the fastener insertion gun 40 may be configured to receive fasteners from the diverter 78 via the fastener supply tube 94, and install each fastener through one of the openings 48 in the drill plate 34 and into the corresponding hole previously drilled in the structure 32. An embodiment of the fastener insertion gun 40 may include a gun body 96; a fastener insertion gun computer 98, display device 100, an operator interface 102; a fastener feed window 104; one or more electronic air valves 106; an internal air delivery subsystem 108; a reader mechanism 110; a concentric collet 112; concentric collet and cycle start buttons 114; an impact mechanism 118; and a sealant dispensing module 120.

The gun body 96 may be configured to house or otherwise physically support other components of the fastener insertion gun 40. The gun body 96 may have substantially any suitable shape desired or needed to fulfill its function, may be constructed from substantially any suitable material, such as carbon fiber reinforced resin or aluminum, and may be constructed using substantially any suitable technology, such as three-dimensional printing or computer-controlled milling technologies. For at least some applications, three-dimensional printing may allow for reduced cost, assembly, maintenance, size, and weight. The gun body 96 may include internal porting for the pneumatic lines of the internal air delivery subsystem 108.

The reader mechanism 110 may be configured to read or otherwise receive information from or exchange information with the RFID or other machine-readable elements 50 of the drill plate 34. In one implement in which the machine-readable element 50 is an RFID element, the reader mechanism 110 may be an RFID reader mechanism. The information may be provided to the faster gun computer 98.

The fastener insertion gun computer 98 may be configured to control some or all aspects of the operation of the fastener insertion gun 40, such as sensing and reading information from the machine-readable elements 50 on the drill plate 34, actuating internal air valves, feeding fasteners, hammering, applying sealant, and other operations. The fastener insertion gun computer 98 may be configured to engage in wireless communication with other systems, machinery, or databases to receive or transmit relevant information. The display device 100 may be configured to visually communicate relevant operation information to the operator of the fastener insertion gun 40.

In one implementation, the fastener insertion gun computer 98 may be configured to compare the fastener information with the set-up of the fastener insertion gun 40 and to automatically shut-off or otherwise block the fastener insertion gun 40 if the fastener information is not correctly reflected in the set-up of the fastener insertion gun 40, thereby avoiding errors in selecting and inserting the fastener in the hole. In another implementation, this function may be performed by the system computer 42.

The display device 100 may employ substantially any suitable display technology, and may be, for example, an otherwise conventional two-point-two inch display. The operator interface 102 may be configured to allow the operator to provide input to the fastener insertion gun computer 98. The operator interface 102 may employ substantially any suitable interface technology (e.g., a keypad). In one implementation, the display device 100 may include touch-sensitive interface technology which fulfills the function of the operator interface 102.

The fastener feed window 104 may be configured to facilitate visually observing movement of a fastener through the fastener insertion gun 40. In one implementation, the fastener feed window 104 may include a transparent material through which the operator can directly visually observe the movement of each fastener.

The electronic air valves 106 may be configured to selectively open to deliver pressurized air to the fastener insertion gun 40 as desired or needed to perform operations, and to selectively close to block the air. The internal air delivery subsystem 108 may be configured to distribute the pressurized air from the air valves 106 within the fastener insertion gun 40 for use by other components (e.g., the impact mechanism 118).

The concentric collet 112 may be configured to be inserted into the opening 48 in the drill plate 34 and then actuated so as to expand the concentric collet 112 within the opening 48 to mechanically secure the fastener insertion gun 40 in place during actual insertion of the fastener. Once the fastener is inserted, the concentric collet 112 may be actuated to contract and allow the fastener insertion gun 40 to be withdrawn from the opening 48. In one implementation, the concentric collet 112 may be generally conventional in design and operation. The concentric collet and cycle start buttons 114 may be configured to be actuated by the operator of the fastener insertion gun 40 to, respectively, actuate the concentric collet 112 and initiate the process of inserting the fastener into the hole.

Referring particularly to FIGS. 9-13B, the impact mechanism 118 may be configured to apply an impact force to an end of the fastener in order to drive the fastener into the hole in the structure 32. In one implementation, the impact mechanism 118 may include an impact tube 124; an impact rod 126; a mass 128 associated with a rearward end of the impact rod 126; a rod tip 130 and a bushing 132 associated with a forward end of the impact rod 126; and a rod and mass retractor 134 configured to reset the impact rod 126 after actuation. In one implementation, the impact mechanism 118 may be configured to be able to seat a fastener having a relatively long grip length and to fully retract to allow a subsequent fastener to move into position. The impact rod 126 and impact mass 128 may move forwardly and rearwardly along a longitudinal axis within the impact tube 124. A rubber bumper 136 may be provided at a forward end of the impact tube 124 to absorb any remaining impact force of the impact rod 126. The bushing 132 through which the impact rod 126 moves may be provided at the forward end of the impact tube 124 to reduce wear due to repeated movement of the impact rod 126. One or more ports 138 may be provided in a wall of the impact tube 124 to allow pressurized air to be introduced to drive the impact rod 126 and impact mass 128 forwardly and rearwardly and thereby actuate and reset them.

The impact rod 126 and impact mass 128 may be separate components which actuate sequentially but reset together. In one implementation, once a fastener is positioned for insertion, pressurized air may be introduced into a port in the wall of the impact tube 124 to move the impact rod 126 forwardly while the impact mass 128 remains rearwardly (seen in FIG. 11). The force applied by the impact rod 126 alone may loosely seat the fastener in the hole. When the fastener insertion gun 40 is actuated, the air may be exhausted from a forward port 138A and introduced into a rearward port 138B to drive the impact mass 128 into the rear end of the impact rod 126 (seen in FIG. 12), and this force may be transmitted via the impact rod 126 to the fastener to firmly seat the fastener in the hole. Pressurized air may then be introduced into the impact tube 124 via the forward port 138A to drive the retractor 134 back to its rearward position, and the retractor 134 may act to return the impact rod 126 and the impact mass 128 to their rearward positions as well.

In one embodiment, the hammering action of the impact mechanism 118 may be fully electrically controlled. The computer 98 may cycle the air valves 106 in the correct sequence to accelerate the impact mass 128 to the front or the rear of the impact tube 124. These cycles can be controlled to impact the fastener a specific number of times desired or required to set a fastener for a particular grip length. An open loop implementation of the impact mechanism 118 may hold corresponding air valves 106 open for a pre-determined period of time (measured in, e.g., milliseconds) which is sufficient for the entire travel of the impact mass 128. After the predetermined period of time has expired, the computer 98 may cycle the air valves 106 to reverse the direction of the impact mass 128 and hold those corresponding air valves 106 open for the pre-determined period of time. The computer 98 may repeat this procedure for a particular number of hits based on the particular grip length of the fastener being set.

Referring also to FIG. 13A, a closed loop implementation of the impact mechanism 118 may use inductive sensing to detect the location of the impact mass 128 within the impact tube 124. The electronic actuation of the impact mass 128 may function substantially similar or identical to the open loop implementation but without the need for fixed timings for the air valves 106. One or more first inductive sensors 140 may be provided in or on the impact tube 124 to sense whether the impact mass 128 has reached the front or the rear of the tube 124. Based on data from the first sensors 140, the computer 98 may sequence the air valves 106 for the impact cycles based on the sensed position of the impact mass 124. Operation of the first sensors 140 may be optimized by placing them in locations slightly before the front or rear of the impact tube 124 to compensate for mechanical lag in the opening of the air valves 106. The closed loop implementation may provide several advantages, including transmitting less impact force to the drill plates 34 and the structure 32, providing an increased number of impact cycles per second, and providing increased life by compensating for wear in the impact mechanism 118.

Referring also to FIG. 13B, in one embodiment, a plurality of second inductive sensors 142 may be embedded in the front section of the impact tube 124 to locate the impact mass 128. Each second sensor 142 may establish an electromagnetic field which provides a set inductance that can be measured (by, e.g., a Texas Instruments LDC1614 integrated circuit) and communicated to the computer 98. The inductance changes as the impact mass 128 enters the electromagnetic field of each second sensor 142. This provides a variable inductance which is closely related to the position of the impact mass 128 relative to the second sensor 142. The plurality of second sensors 142 may be positioned sequentially in a bank of between two and four sensors to cover the full range of movement of the impact mass 128 while it is hammering a fastener. Being able to detect where the impact mass 128 is at the front of the impact tube 124 allows for determining when a fastener is fully seated due to the stackup of the impact mass 128 and the impact rod 126. This can be calibrated by extending the mass 128 and the rod 126 to a flat surface simulating a seated fastener, and then measuring the inductance values from the second sensors 142 that is unique to the location of the impact mass 128.

The impact force for each cycle may be controlled by any of several methods. The kinetic energy stored in the impact mass 128 at the moment of impact is transferred through the impact rod 126 acting directly on the fastener. With an assumed velocity of 0 at the point of impact, the impact energy is equivalent to the kinetic energy described by the kinetic energy equation 0.5×mass×velocity^2. The kinetic energy stored in the impact mass 128 is equivalent to the work done on the mass 128 described by the equation force×distance=work. Therefore, the force applied to or distance traveled by the impact mass 128 may be modified to reduce the impact energy imparted to the fastener.

In a first implementation, variable pressure regulation may be used to reduce forces acted upon the mass 128. This may be accomplished by either a manually or an electronically adjusted regulator supplying the air valves 106. In a second implementation, a variable restrictor may be positioned before the air valves 106 to reduce the fill rate of the impact tube 126. This may function similar to the first implementation but provides an initial high-pressure pulse before the air volume is depleted between the restrictor and the air valves 106. In a third implementation, the air valves 106 at the forward end of the impact tube 126 may be restricted. During actuation, high pressure at the rearward end of the impact tube 126 drives the impact mass 128 forward, and the forward end may be vented in order to avoid increasing pressure which could reduce the net force acting upon the impact mass 128. This venting may be purposely varied either manually or electrically by restricting the exhaust flow so as to reduce impact energy. In a fourth embodiment, one or more of the air valves may be controlled to shut off the supply air early in the impacting action to reduce the overall force applied to the impact mass 128. The effect of applying full force for only a portion of the length of the impact tube 124 is similar to shortening the tube 124.

Figure 14:
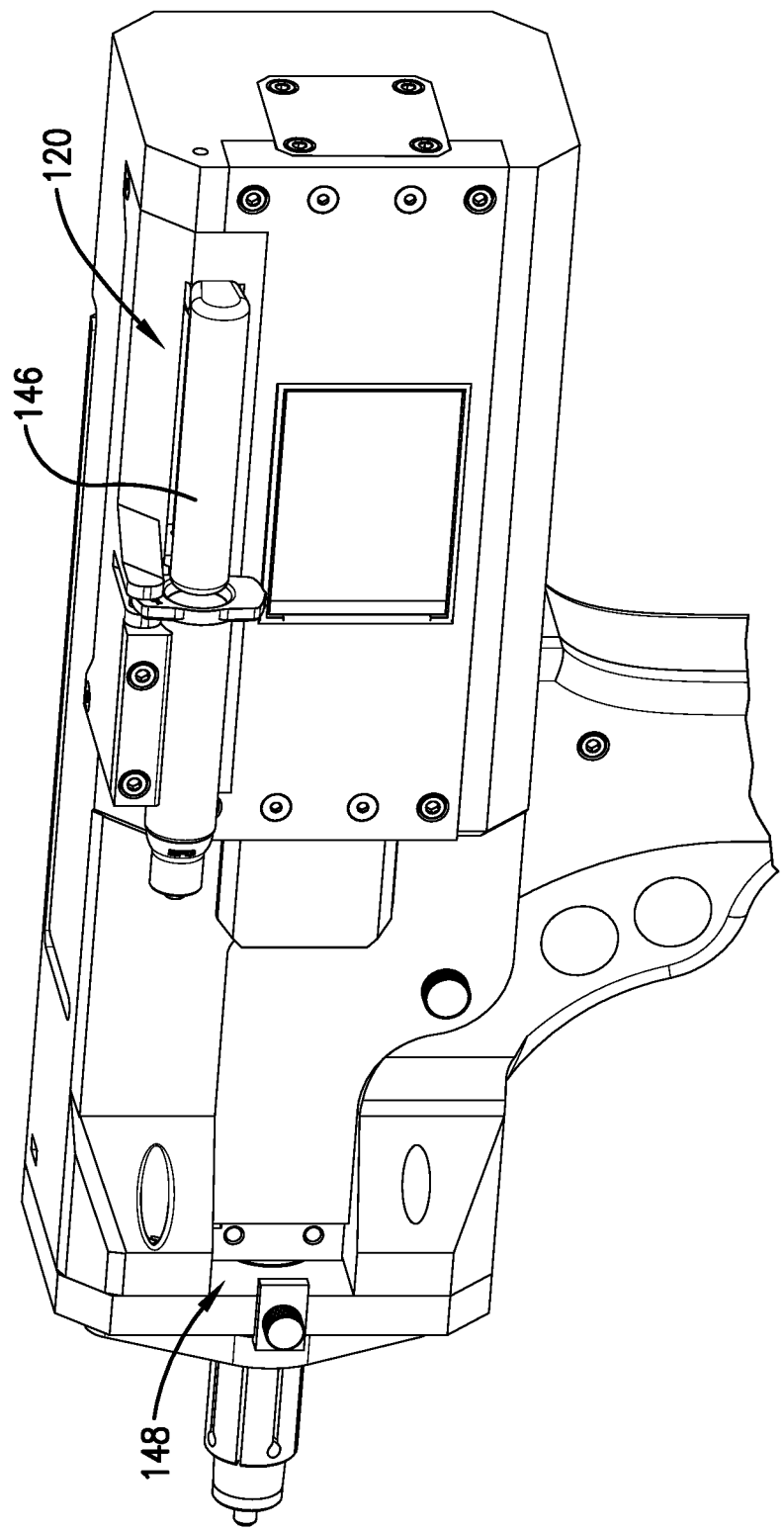
FIG. 14 is a cross-sectional perspective view of the fastener insertion gun of FIG. 7 showing a sealant dispensing module component.
Figure 15:
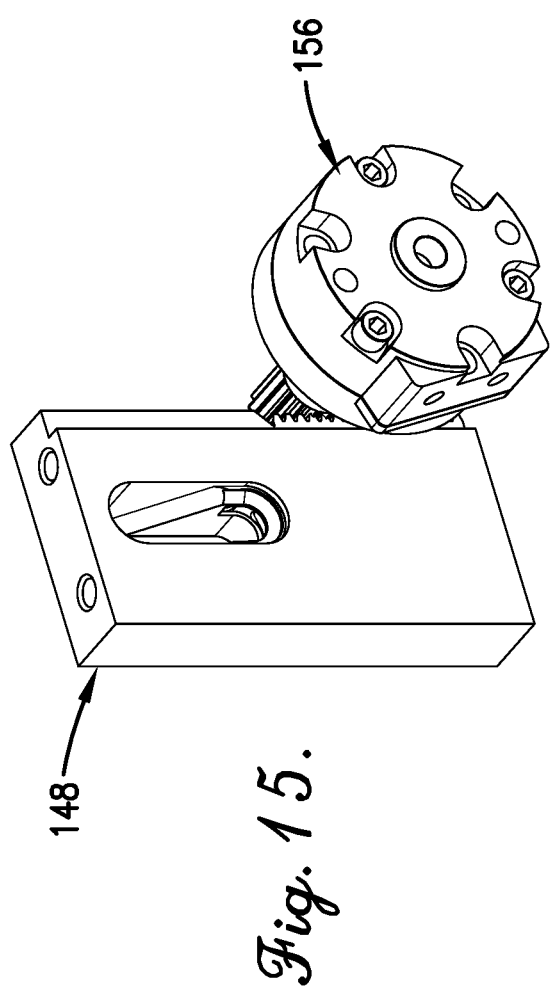
FIG. 15 is perspective view of first subcomponents of the sealant dispensing module of FIG. 14.
Figure 16:
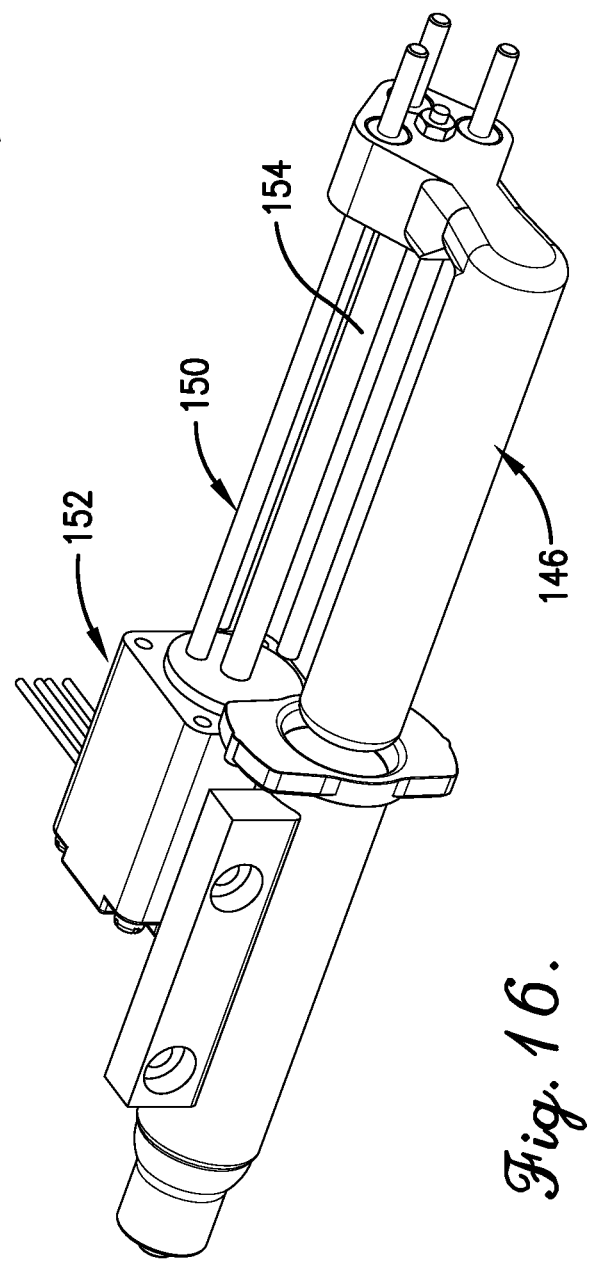
FIG. 16 is an isometric view of second subcomponents of the sealant dispensing module of FIG. 14.

Referring particularly to FIGS. 14-16, the sealant dispensing module 120 may be configured to dispense a sealant as needed to seal a fastener in a hole. In one implementation, the sealant dispensing module 120 may receive removable cartridges containing the sealant to be dispensed. The sealant cartridges may be disposable, refillable, or recyclable. A plunger 146 may be actuated to move sealant from the cartridge to an applicator outlet mechanism 148 which applies the sealant to the fastener before insertion. The plunger 146 may be driven along one or more guide rods 150 by an electric stepper motor 152.

In one implementation, the sealant dispensing module 120 may use standard (e.g., 5 cc) cartridges. The electronically controlled stepper motor 152 with a high pitch screw 154 attached to the plunger 146 may be utilized to pump the sealant at specific doses. This positive displacement design allows precise dispensing of the sealant material. A standard 6 mm tube may extend between the 5 cc cartridge and the applicator outlet mechanism 148. The outlet mechanism 148 may be actuatable by an electric motor 156 approximately 15 mm to an "up" position in which it may "catch" the fastener, and may be actuatable to a "down" position in which the fastener and the impact rod 126 passes through. The sealant is ported through the outlet mechanism 148 such that sealant is applied to the caught fastener during actuation. A plurality (e.g., three) of ports may be exposed to apply sealant at a plurality (e.g., three) of locations across the fastener. One or more (e.g., two) of the locations may apply sealant along the sides of the fastener, and one or more (e.g., one) may apply sealant to the bottom of the fastener, thereby creating the required seal. The outlet mechanism 148 may be a consumable item which is replaced as the sealant expires. Actuation of the outlet mechanism 148 may be accomplished electrically or pneumatically, and may be controlled by the gun computer 98. The impact rod 126 in a low-pressure state may provide the capture required to fully seat the fastener in the outlet mechanism 148.

The system computer 42 may include a quality management system (QMS) 150 configured to gather information from one or more components of the system (e.g., the drill plate 34, the drill gun 36, the fastener delivery subsystem 38, the fastener insertion gun 40) and, as desired or needed, information from external sources, and display or otherwise communicate quality control information, including errors. In one implementation, the QMS 150 may be configured to perform a variety of relevant and useful functions, such as automatically preventing placing fasteners in holes that have not been drilled, preventing failing to place fasteners in holes that have been drilled, avoiding incorrect drilling or insertion sequences, avoiding using expired or incorrect sealant, avoiding using incorrect drill plates for particular applications, and identifying and assist in addressing problems with the movement of fasteners through the system. Relatedly, the QMS 150 may be configured to track the progress of each job, such as which holes have been drilled and which fasteners have been installed. The QMS 150 may be further configured to generate a report detailing the holes that were drilled or not drilled and the fasteners that were installed or not installed.

As discussed, in one implementation, the system computer 42 may be configured to compare the required hole and fastener information with the set-up of other components of the system and to automatically shut-off or otherwise block the drill gun 36 or the fastener insertion gun 40 if the required hole or fastener information is not reflected in the set-up (e.g., the installed drill bit or the available fasteners), thereby preventing drilling an incorrect hole or inserting an incorrect fastener.

Figure 17:
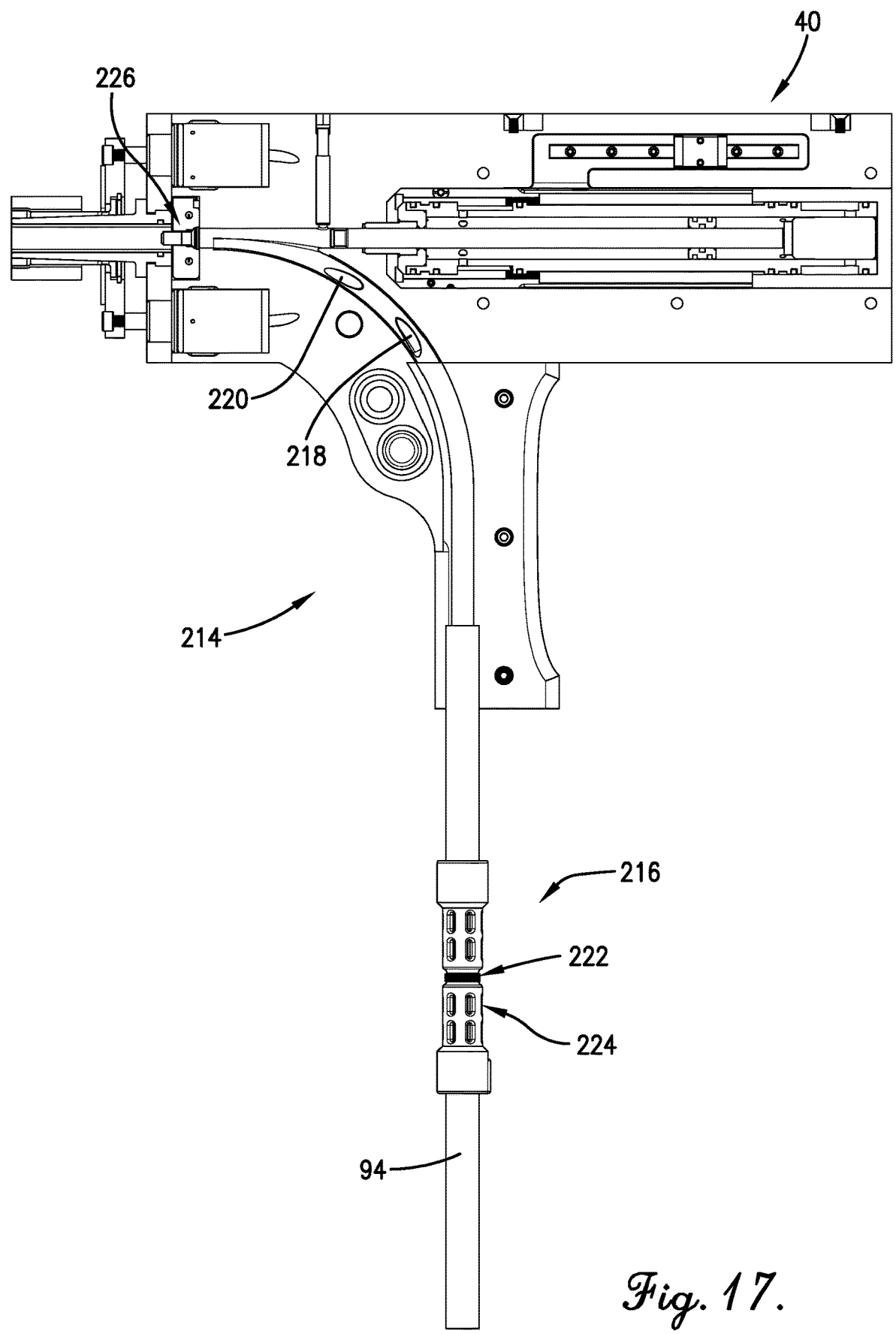
FIG. 17 is a fragmentary cross-sectional side elevation view of the fastener insertion gun component and a fastener supply tube component of the fastener delivery subsystem of FIG. 1.

Referring to FIG. 17, a fastener catch mechanism 214 may be along each fastener supply path, and may include a catch device 216, a first catch port 218, and a second catch port 220. The catch device 216 may be spliced into the fastener supply tube 94, and may include one or more inductive sensing coils 222 configured to sense the presence of a fastener in the supply tube 94, and one or more vents 224 configured to release air pressure to slow the fastener prior to entering the fastener insertion gun 40. The first catch port 218 may provide pressurized air to further slow and catch the fastener within the fastener insertion gun 40, and the second catch port 220 may provide pressurized air to create a venturi effect to bring the fastener into a final position 226 within the fastener insertion gun 40 for installation.

Figure 18:
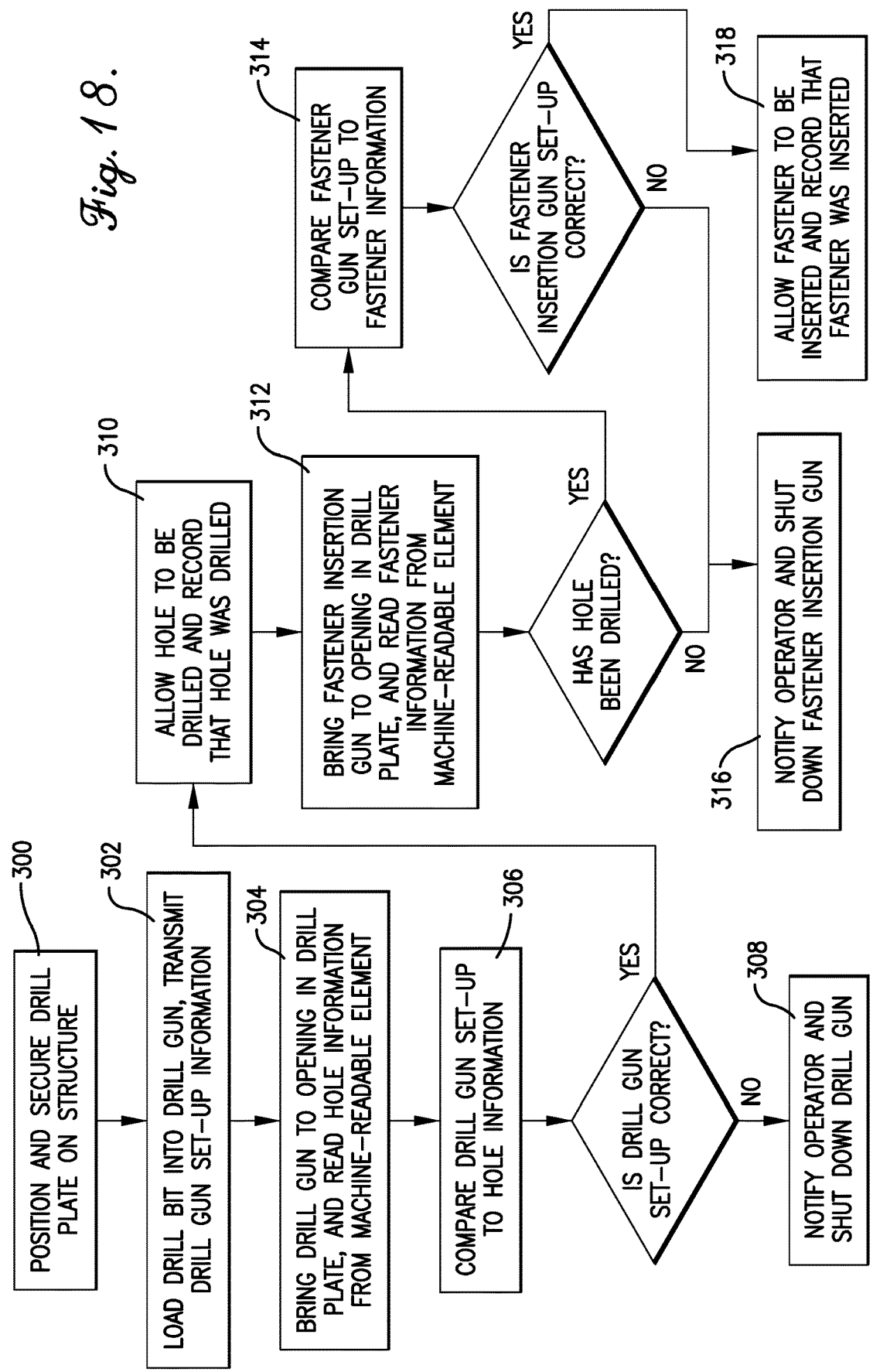
FIG. 18 is a flowchart of steps involved in the use and operation of the drill plate.

Referring also to FIG. 18, the drill plate 34 may be used and may operate substantially as follows. The one or more drill plates 34 presenting the openings 48 may be positioned at particular locations on the aircraft fuselage or other aerospace or vehicle body or structure 32, as shown in step 300.

The drill bit 60 may be loaded into the drill gun 36, the drill gun 36 may transmit relevant drill gun set-up information about the drill bit (e.g., type, diameter, length, material) and other relevant operational parameters to the drill gun computer 60 or the system computer 42, as shown in step 302. The drill gun 36 may be brought into physical proximity with a particular one of the openings 48 through which a hole may be drilled in the structure 32, and the reader mechanism 56 on the drill gun 36 may read relevant hole information from the RFID or other machine-readable element 50 associated with the particular opening 48, as shown in 304. The drill gun computer 60 or the system computer 42 may compare the drill gun set-up information with the hole information and determine whether the set-up is incorrect or correct for the hole, as shown in 306. If the set-up is incorrect for the hole, then the drill gun computer 60 or the system computer 42 may notify the operator via the display device 58 on the drill gun 36, and may prevent the drill gun 36 from operating until the set-up is corrected, as shown in 308. If the set-up is correct for the hole, then the drill gun computer 60 or the system computer 42 may allow the operator to drill the hole, and may record in the electronic memory element 54 that the hole was drilled, as shown in 310.

The fastener insertion gun 40 may be brought into physical proximity with a particular one of the openings 48 through which a fastener may be installed in the previously drilled hole, and the reader mechanism 110 on the fastener insertion gun 40 may read relevant hole information from the RFID or other machine-readable element 50 associated with the particular opening 48, as shown in 312. The fastener insertion gun computer 98 or the system computer 42 may compare the fastener insertion gun set-up information with the hole information and determine whether a hole has, in fact, been drilled through the particular opening, and if so, whether the fastener insertion gun set-up is incorrect or correct for the hole, as shown in 314. If the hole has not, in fact, been drilled or if the fastener insertion gun set-up is incorrect for the hole, then the fastener insertion gun computer 98 or the system computer 42 may notify the operator via the display device 100 on the fastener insertion gun 42, and may prevent the fastener insertion gun 42 from operating until the fastener insertion gun set-up is corrected, as shown in 316. If the hole has, in fact, been drilled and the set-up is correct for the hole, then the fastener insertion gun computer 98 or the system computer 42 may allow the operator to insert a fastener into hole, and may record in the electronic memory element 54 that the fastener was inserted, as shown in 318.

Figure 19:
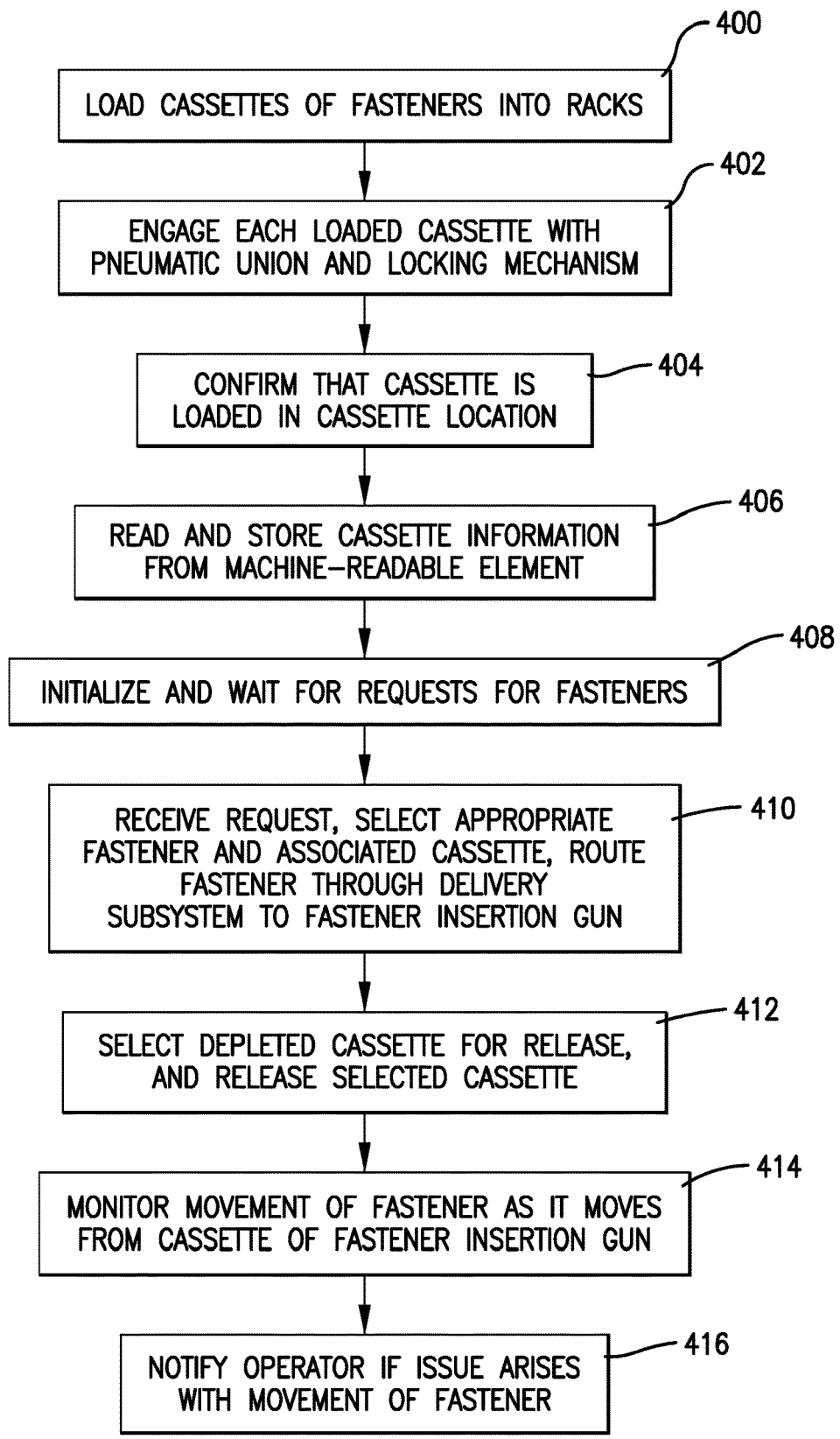
FIG. 19 is a flowchart of steps involved in the use and operation of the fastener dispensing subsystem.
Figure 20:
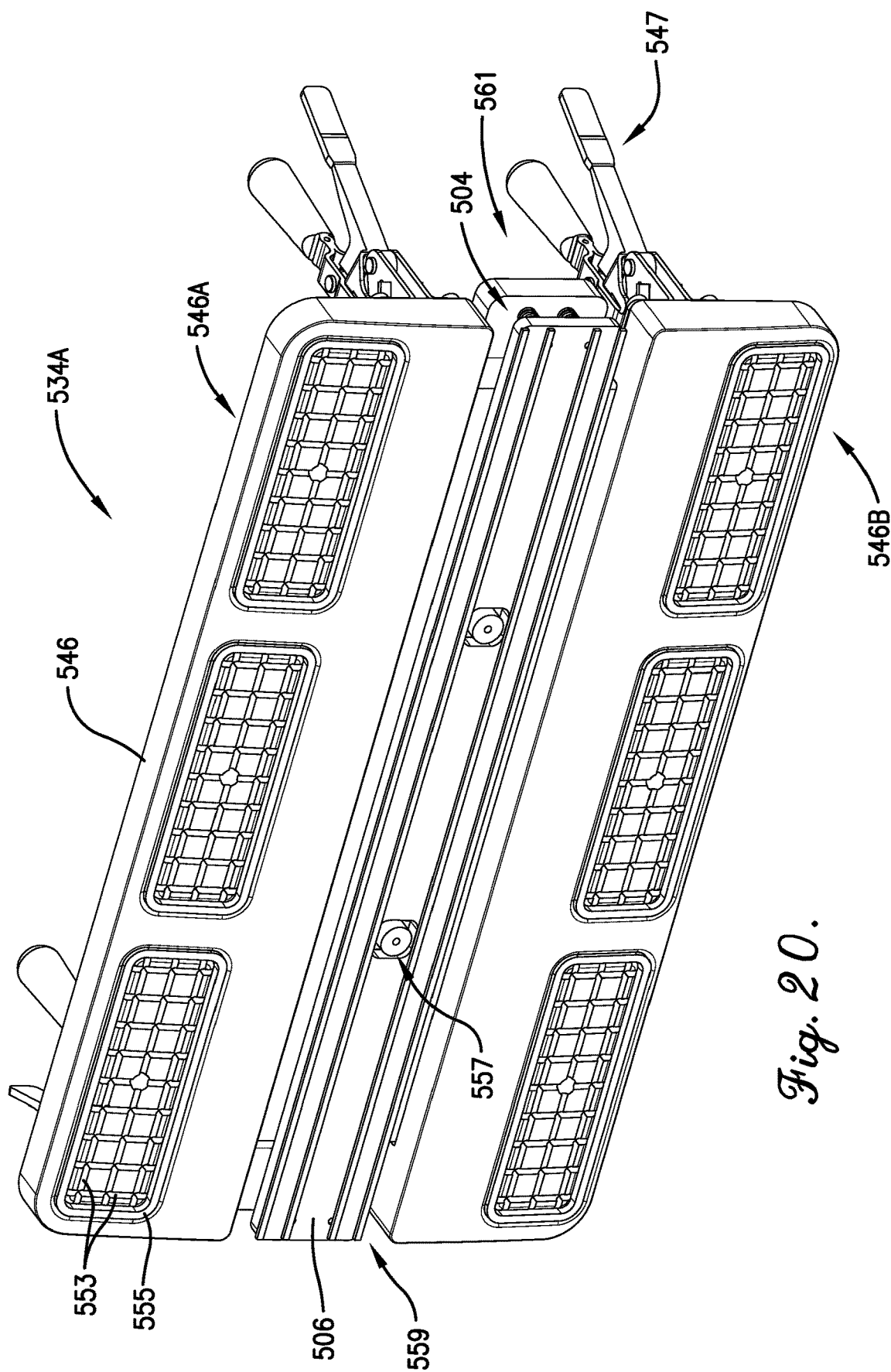
FIG. 20 is an isometric view of a first side of an embodiment of a rivet bucking inner mold line tool for facilitating the installation of the fastener in the hole of the vehicle structure.
Figure 21:
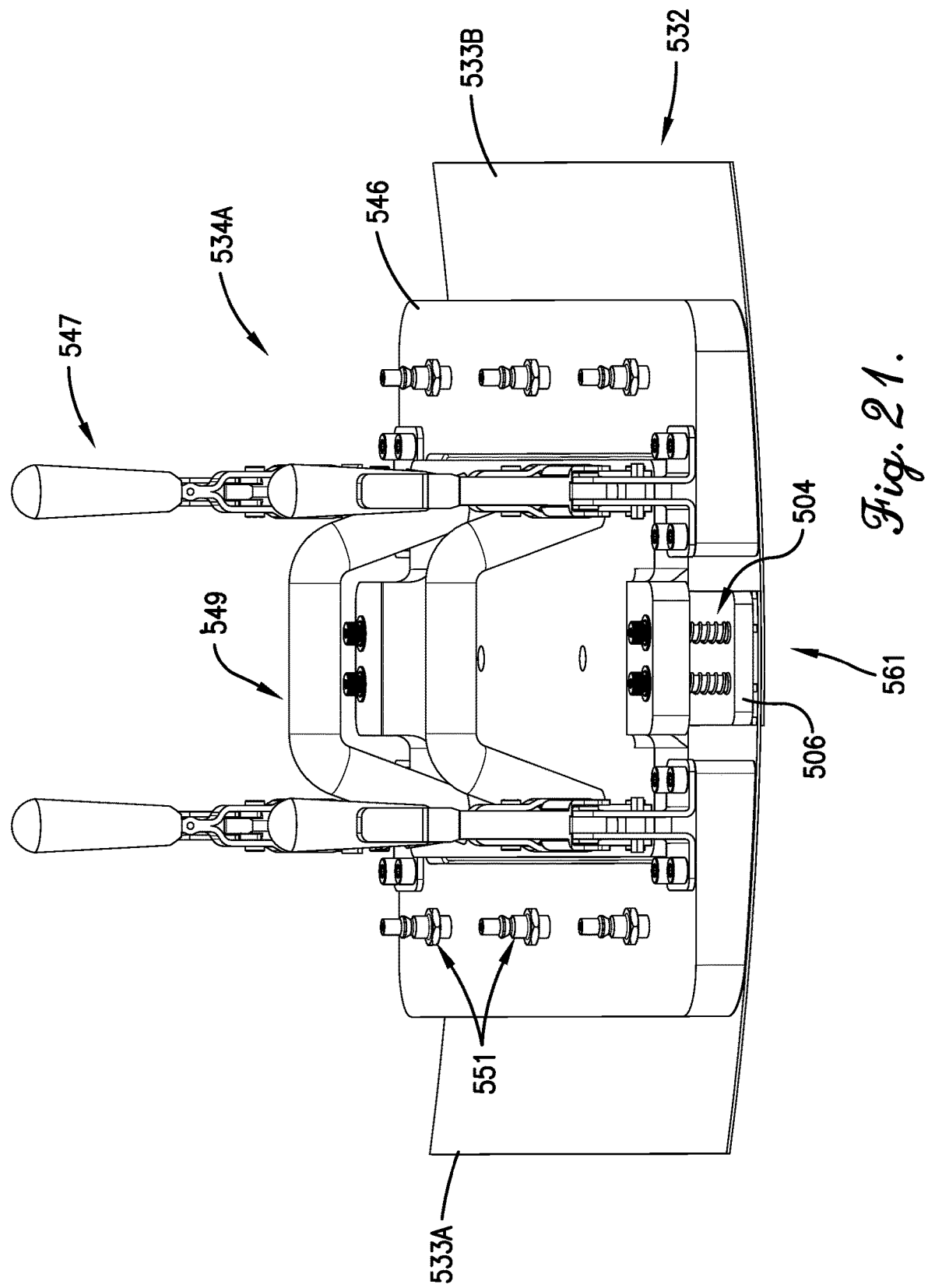
FIG. 21 is a perspective view of a second side of the tool of FIG. 20.
Figure 22:
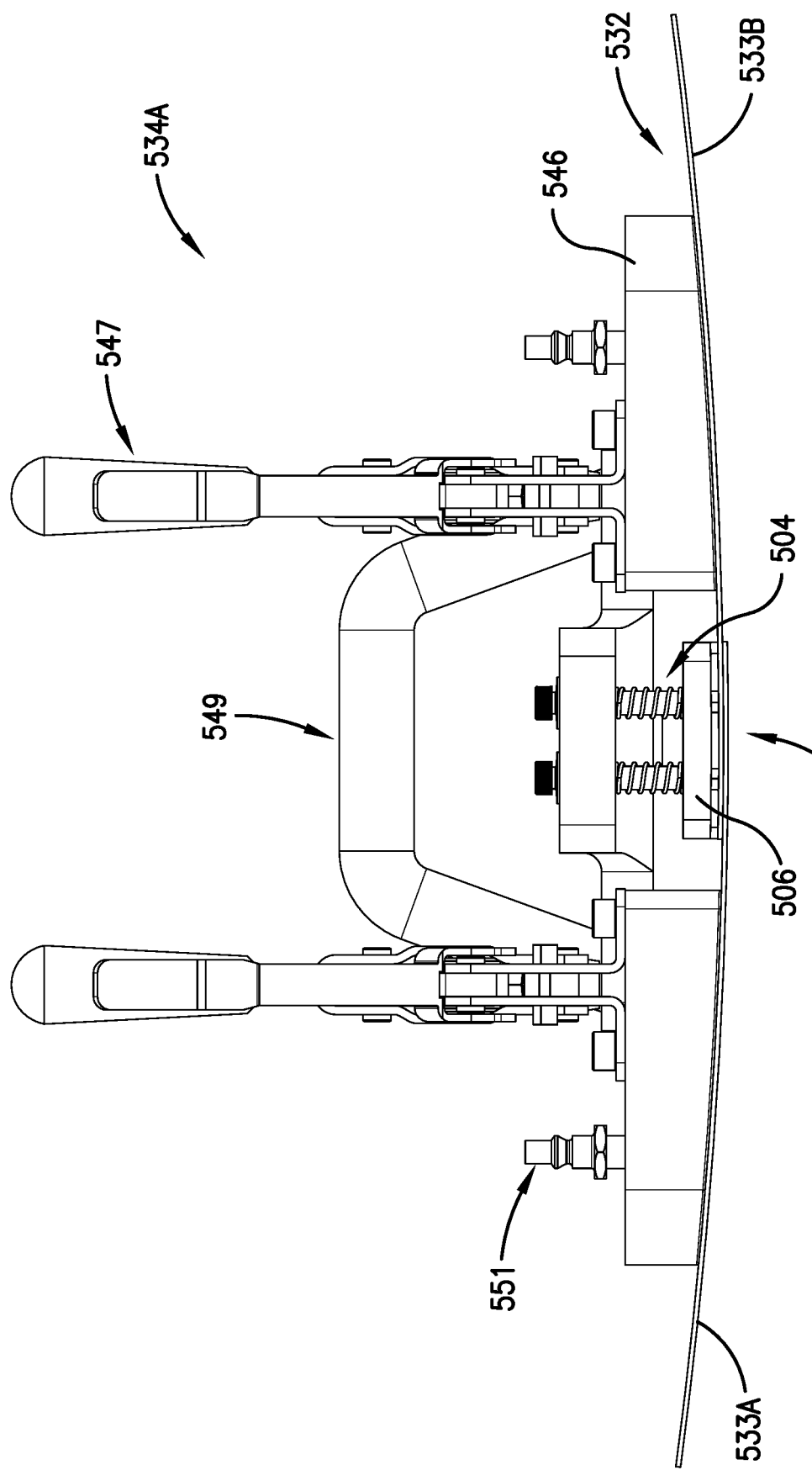
FIG. 22 is an elevation view of the tool of FIG. 20.
Figure 23:
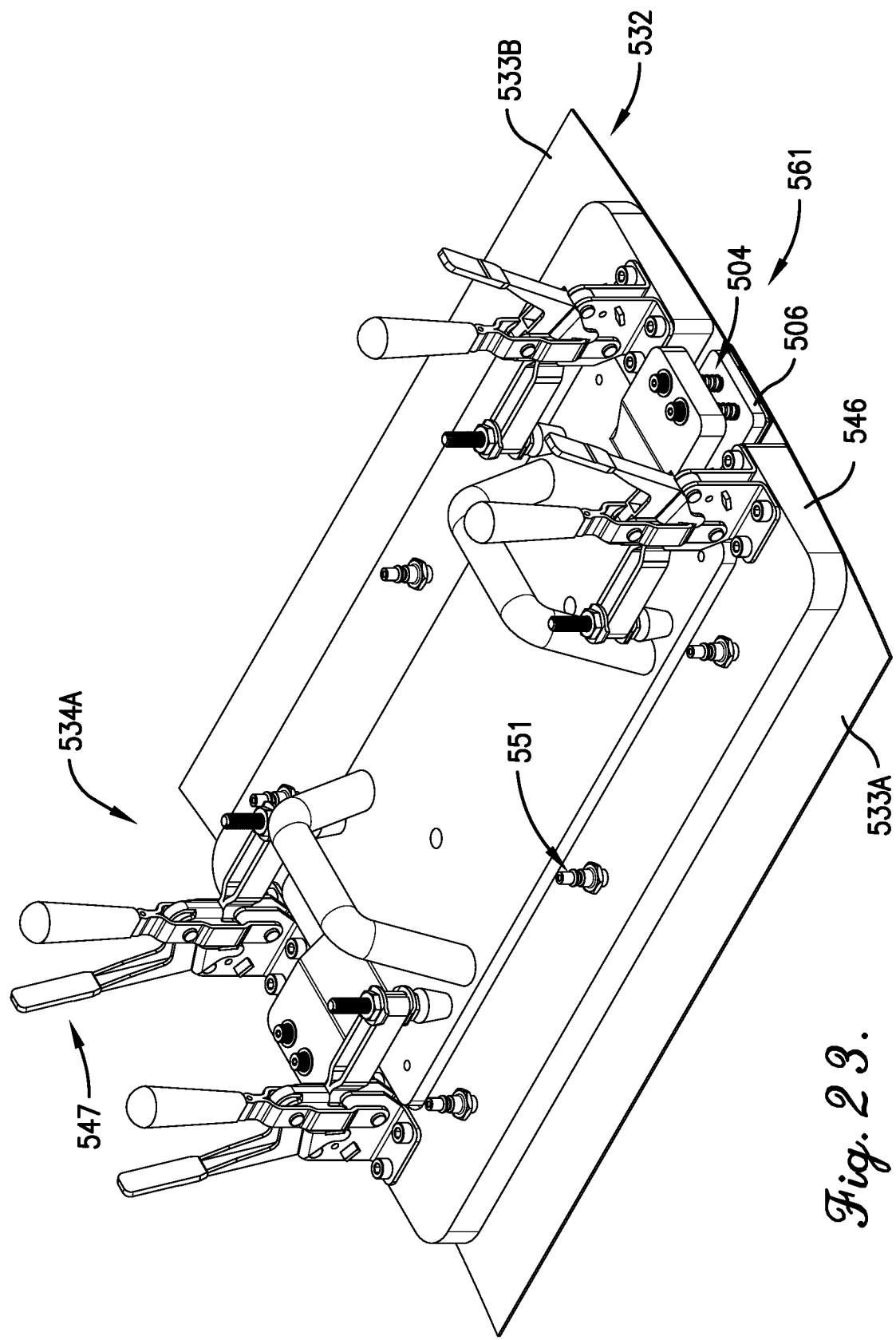
FIG. 23 is an isometric view of the second side of the tool of FIG. 20.

Referring also to FIG. 19, the fastener delivery subsystem 38 may be used and may operate substantially as follows. One or more cassettes 68 of fasteners may be loaded into the racks 66 in the cabinet 64, as shown in 400. As each cassette 68 is loaded into the rack 66, the cassette 68 may engage with the pneumatic union and locking mechanism 70,72, as shown in 402. The proximity sensor 90 integrated into the cassette location may confirm that the cassette 68 is loaded, as shown in 404. When the cassette 68 is detected by the proximity sensor 90, the reader mechanism 92 on the rail 74 may read and store relevant information from the machine-readable element associated with the cassette 68, as shown in 406. Once all the cassettes 68 are loaded, the fastener delivery subsystem 38 may be initialized, and may then wait for requests for fasteners from the fastener insertion gun 40, as shown in 408.

When a fastener request is received from the fastener insertion gun 40, the fastener delivery subsystem 38 may select the appropriate fastener from one of the cassettes 68 in the rack 66 and route it through the subsystem 38 to the fastener insertion gun 40, as shown in 410. When multiple cassettes are loaded with the same type of fastener, the fastener subsystem computer 98 may strategically pull the fastener from the same cassette 68 in order to fully deplete one before switching to another cassette 68. If two or more fasteners of the same type and grip length are called for at the same time, the fastener delivery subsystem computer 98 may pull from a primary cassette first and then from a secondary cassette. The fastener delivery subsystem 38 may include parallel fastener delivery paths to multiple fastener insertion guns 40 in order to increase throughput and redundancy of the primary components required to complete the process.

When a cassette 68 is depleted of fasteners (or if there is an error), an operator can select the cassette 68 using the operator interface 102 with the fastener delivery subsystem computer 98 and have the cassette 68 released from the rack 66, as shown in 412. The sensors 86 located in the fastener delivery subsystem 38 may monitor the position of the fastener as it travels from the cassette 68 to the fastener insertion gun 40, as shown in 414. If any issues arise during the transit of the fastener, the operator may be visually notified via the display device 100 on the fastener insertion gun 40 as well as on the display device 82 of the cabinet 64, as shown in 416.

Referring also to FIGS. 20-31, embodiments of the present invention may further include the first drill plate 34A configured as a rivet bucking inner mold line (IML) tool or device 534A for facilitating the installation of rivets or similar fasteners to secure first and second components (e.g., two (or more) panels or a panel and a stringer) of a vehicle structure (e.g., an aircraft body) 532 together. Implementations of the rivet bucking IML, tool 534A may be substantially similar or identical to the first drill plate described above and may include any one or more of the features and/or functions described in connection therewith, except as otherwise described below. As discussed, the prior art process for installing rivets in vehicle structures is a manual process in which one technician on one side of the structure selects and inserts the appropriate rivet and then uses a rivet hammer with an appropriate set to form the rivet, and another technician on the opposite side of the structure uses a bucking bar to provide a surface to form the rivet as the hammer is working. This requires that the two technicians be aware of and synchronized with each other's actions to avoid skin quality defects. Bucking rivets can cause significant strain on the body of the technician wielding the bucking bar, including large vibrations and significant forces trained on their hands. The rivet bucking tool 534A advantageously eliminates the need for a technician to hold a bucking bar, and thereby both reduces the number of people required to install rivets and eliminates a significant source of physical strain and fatigue in the manufacturing process.

Broadly, the rivet bucking IML tool 534A may include a body 546; one or more connecting mechanisms 547; one or more handles 549; a backing plate 506; and a plurality of springs 504. In an example operational environment, shown in, e.g., FIG. 27, the structure 532 may include a first component 533A positioned so as to overlap a second component 533B, with the overlapping region presenting a plurality of pre-drilled holes H through which rivets R may be installed so as to secure the first and second components 533A,533B together.

The body 546 may take the form of a plate shaped to at least generally match a concave or other contour of the relevant surface of the structure 532. In one implementation, the body 546 may be a carbon fiber reinforced resin plate which is three-dimensionally printed or machined. The body 546 may include one or more vacuum connections 551 attached to or otherwise associated with the body 546 and configured to be connected to a vacuum source in order to facilitate creating a pressure differential between the body 546 and the surface of the structure 532 so as to secure the body 546 to the surface while the vacuum is maintained. Relatedly, the body 546 may further include one or more vacuum channels 553 provided on a side of the body 546 which is proximate to the surface of the structure 532, and configured to allow the vacuum to be introduced between the body 546 and the structure 532. In one implementation, a gasket material 555 may be provided to better seal the vacuum channels 553 to the structure 532 and thereby better maintain the pressure differential. The body 546 may further include one or more locating mechanisms 557 configured to assist in aligning the bucking tool 534A with the locations for installing the rivets R. The locating mechanisms 557 may use substantially any suitable physical, electric, or magnetic technologies to accomplish this function.

Figure 24:
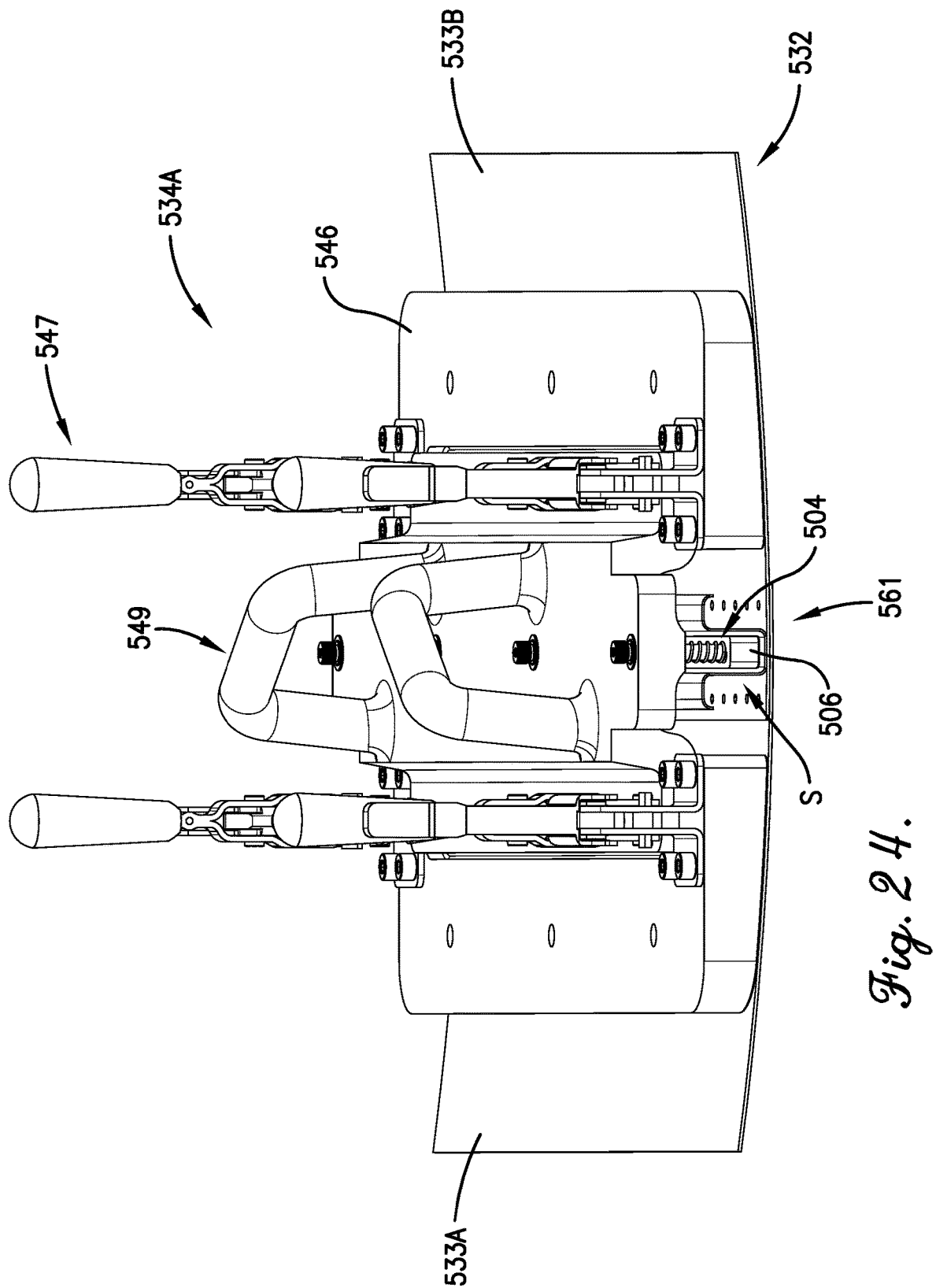
FIG. 24 is a perspective view of a second side of an implementation of the rivet bucking inner mold line tool configured to accommodate a stringer.
Figure 25:
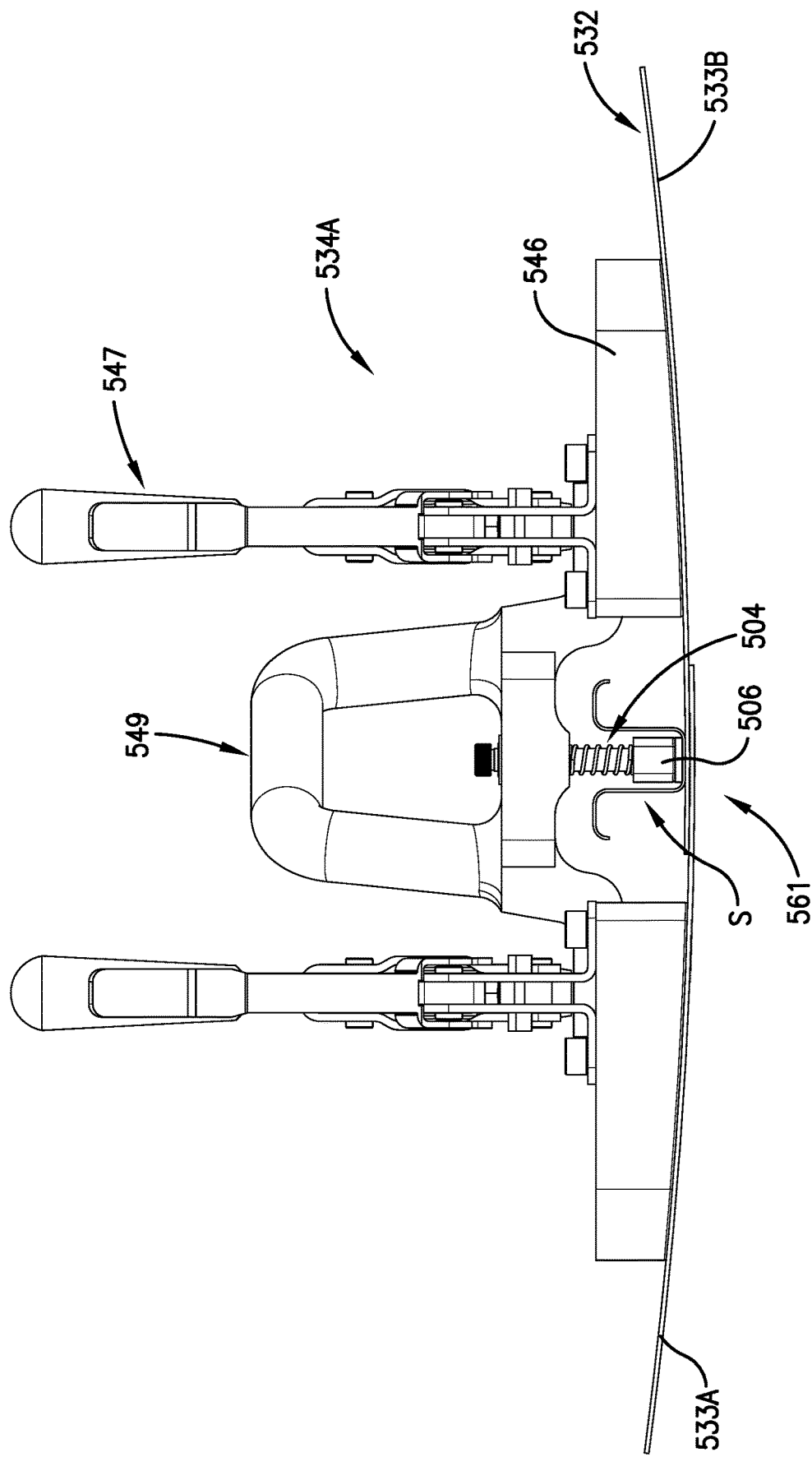
FIG. 25 is an elevation view of the tool of FIG. 24.
Figure 26:
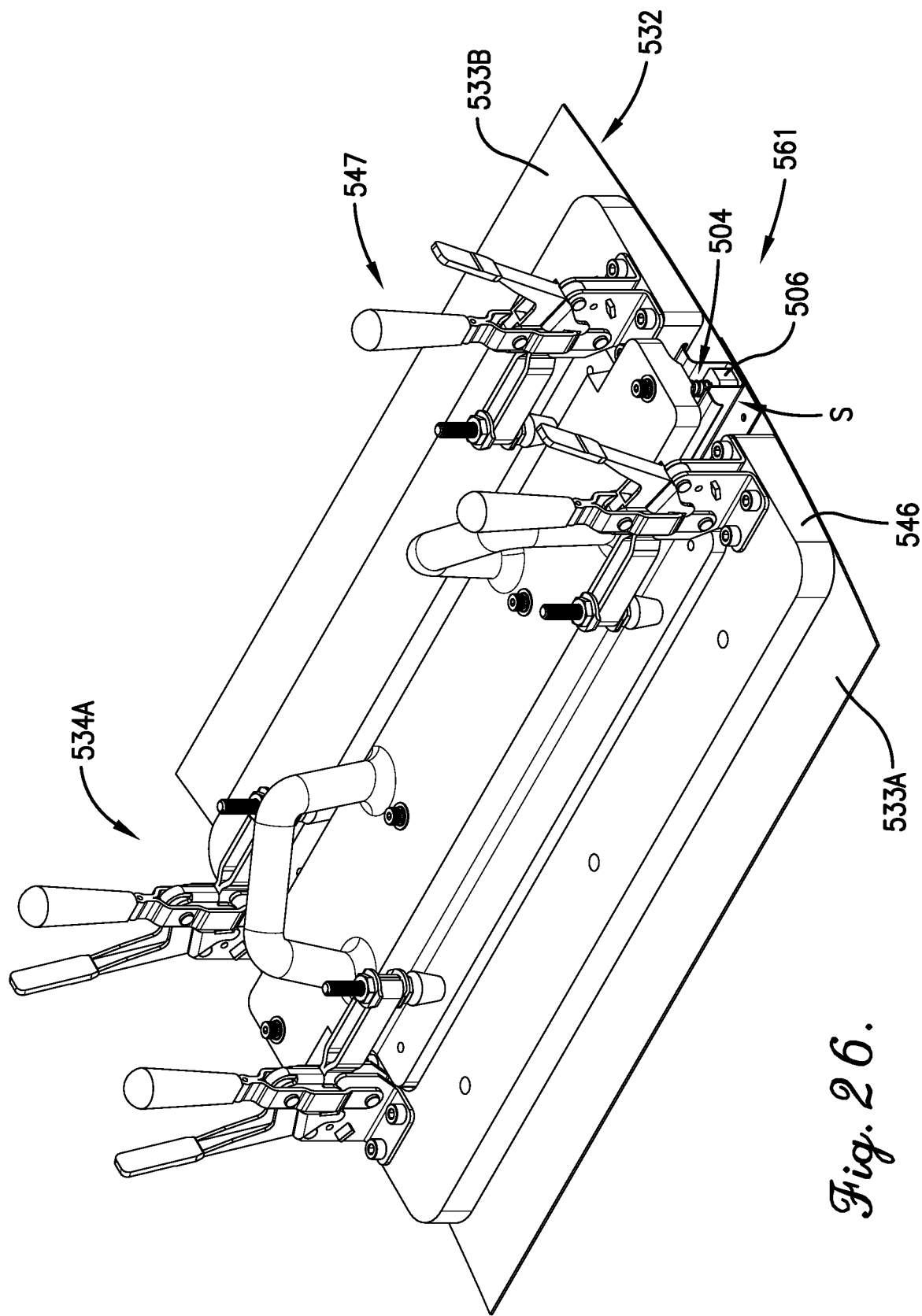
FIG. 26 is an isometric view of the tool of FIG. 24.

In a first implementation, the body 546 may include at least three distinct elements, including first and second supporting elements 546A,546B and a central element 561 including the backing plate 506 and springs 504, which may be separable and connectable as needed or desired in order to, e.g., accommodate different structures or replace worn or damaged parts. In one implementation, the central element 561 may be replaceable so as to allow for accommodating areas without stringers S (as seen in FIGS. 20-23) or for accommodating areas with stringers S (as seen in FIGS. 24-26) or where one of the components is a stringer, as needed or desired. In a second implementation, seen in FIGS. 28 and 29, the body may include at least two distinct elements, including a single supporting element, comprising the first and second supporting elements 546A,546B as a single piece, and the central element 561. Again, the supporting and central elements may be separable and connectable and the central element may be changeable, as needed or desired. In a third implementation, the body may be constructed as a single piece in that the supporting and central elements are not able or, at least, not generally intended to be separated, except perhaps, for repair or replacement due to damage. Thus, in at least some implementations, the central element 561, which includes the backing plate 506 and the plurality of springs 504, may be removable and replaceable with respect to the rest of the body 546 in order to introduce a different backing plate having a different shape (e.g., broader or narrower) and/or a different plurality of springs having a different arrangement (e.g., double row or single row).

The one or more connecting mechanisms 547 may be included in the implementations involving two or more distinct body elements and may be configured to facilitate connecting and securing the elements together. In one implementation, the connecting mechanisms 547 may provide a clamping force on the supporting and central elements, wherein the clamping force is manually applicable to connect the elements together and releasable to allow for separating them, as needed or desired. In other implementations, substantially any suitable additional or alternative technology may be incorporated into the connecting mechanisms 547.

The one or more handles 549 may be formed into or onto, attached to, or otherwise associated with the body 546 and configured to facilitate moving and positioning the bucking tool 534A as needed or desired, including positioning the bucking tool 534A on the structure 532.

The backing plate 506 may be supported on or otherwise associated with the body 546 and positioned proximate to the plurality of holes H in the structure 532 when in use, and configured to provide a mass against which the rivets R are struck from the opposite side of the structure 532 so as to deform and thereby secure the rivets R in the holes H. In one implementation, the backing plate 506 may take the form of a hardened steel plate. In one implementation, a protective material 559 may be used to space the backing plate 506 away from the surface of the structure 532 to avoid marring the surface. The protective material 559 may be substantially any suitable material, such as a rubber strip or sheet material. The backing plate 506 may be attached to the body 546 with substantially any suitable fasteners or fastening technology.

The plurality of springs 504 may be positioned behind the backing plate 506, and configured to bias the backing plate 506 toward the surface of the structure 532 proximate to the holes H, and further configured to absorb at least a portion of the impact of striking the rivets R and to maintain the backing plate 506 seated against the rivets R during repeated strikes by a tool (e.g., the fastener insertion gun 40, described above) located on an opposite side of the structure 532.

FIGS. 20-23 show a first implementation of the bucking tool 534A configured to install rivets R in components 533A,533B in places where no stringers are located. FIGS. 24-26 show a second implementation of the bucking tool 534A configured to install rivets R in components 533A, 533B in places where stringers S are located or where one of the components is a stringer. The second implementation may be otherwise substantially similar or identical to the first implementation except that the first implementation may comprise a wider backing plate 506 and correspondingly more springs 504 (e.g., a double row, as shown), while the second implementation may comprise a narrower backing plate 506 to accommodate the relatively narrow channel formed by the stringer S and correspondingly fewer springs 504 (e.g., a single row, as shown). Thus, in the second implementation, the backing plate 506 and the springs 504 are physically adapted to install the plurality of fasteners in the plurality of holes H within the relatively narrow channel formed by the stringer S.

Figure 27:
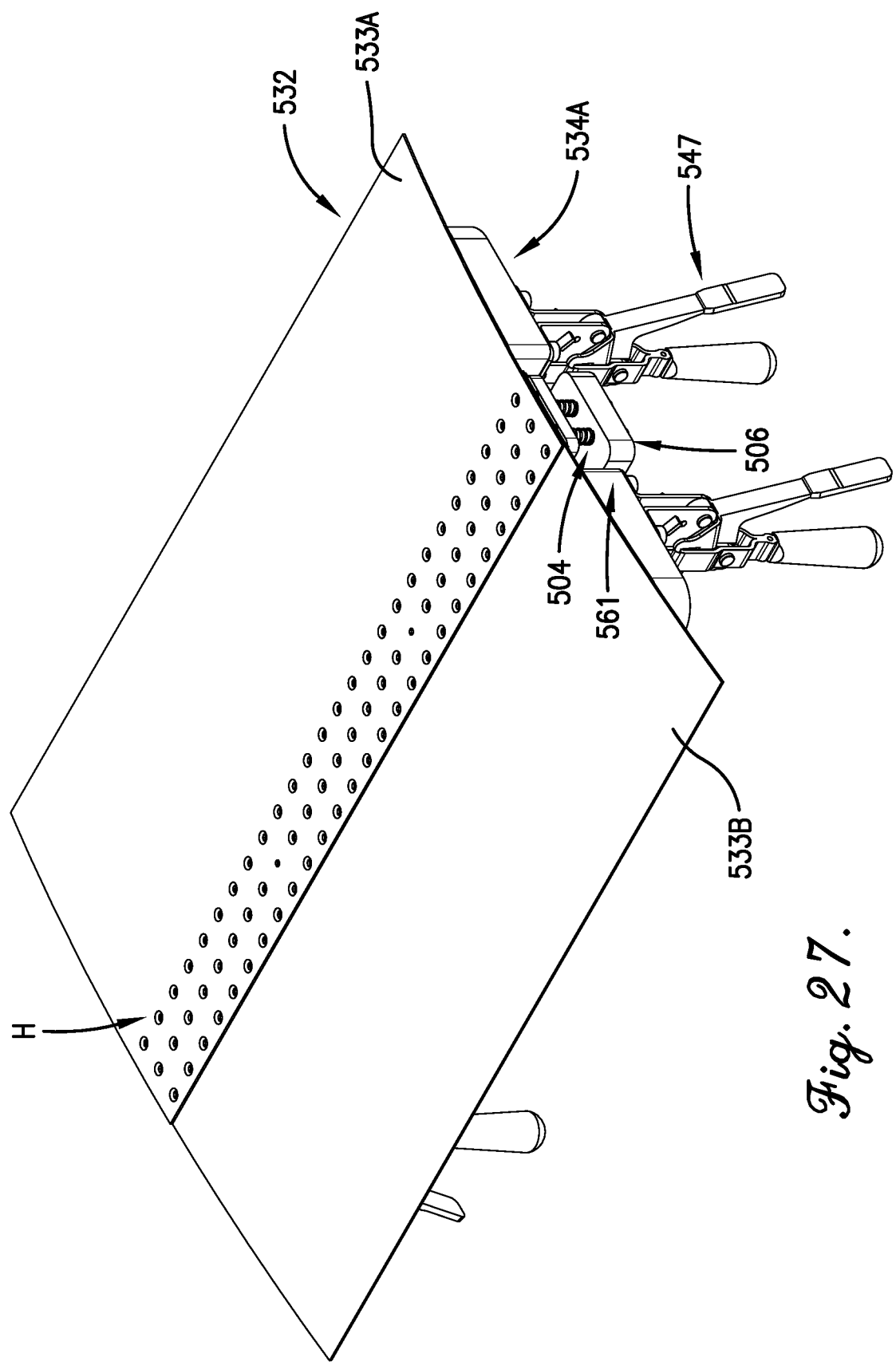
FIG. 27 is an isometric view of a second side of the vehicle structure to which is attached the tool of FIG. 20.
Figure 28:
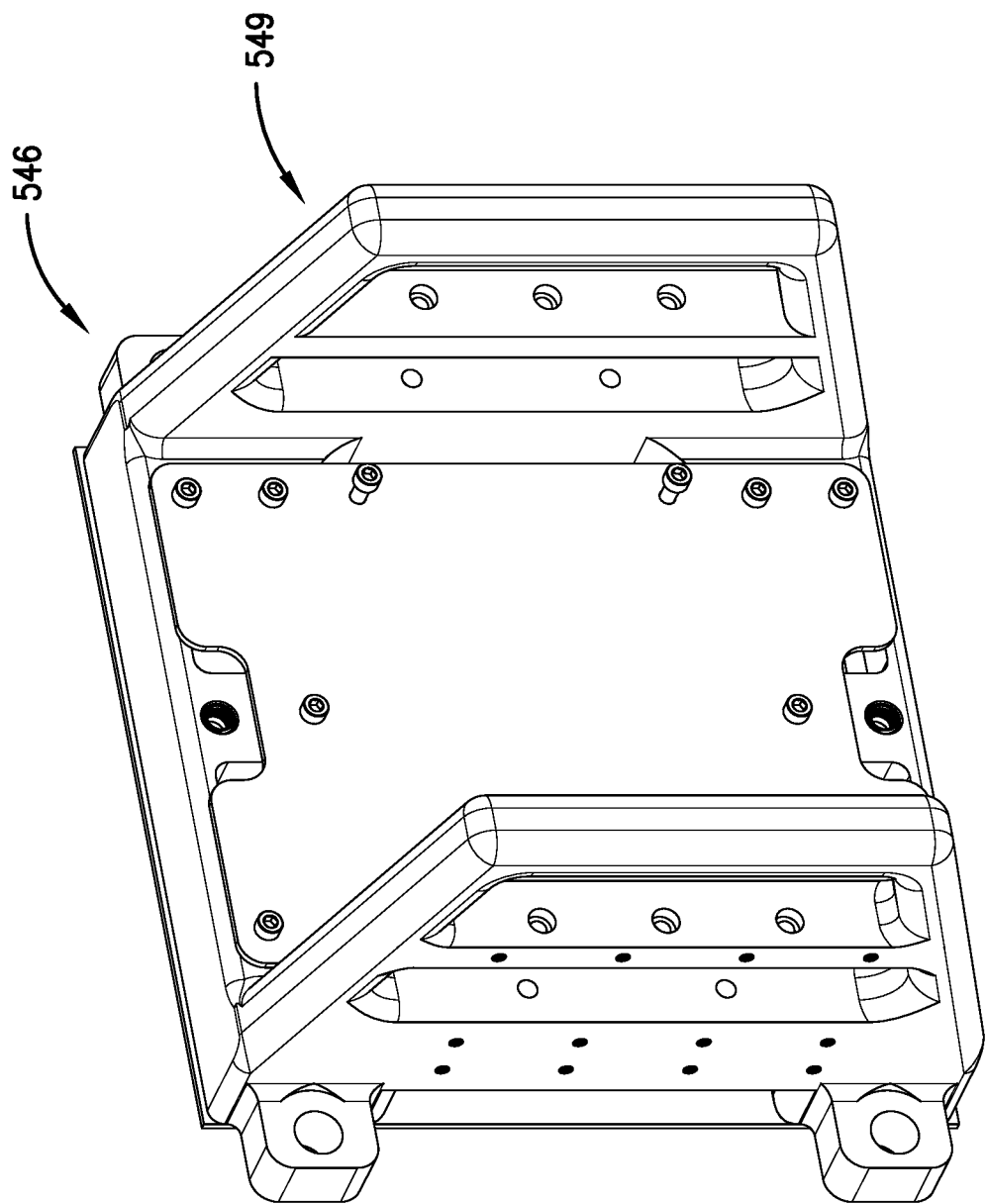
FIG. 28 is a perspective view of a second side of an implementation of the rivet bucking inner mold line tool of FIG. 20 including a single piece body component.

Referring particularly to FIGS. 27, 30, and 31, the bucking tool 534A may be positioned on a first surface (e.g., an interior surface) of the vehicle structure 532. In one implementation, the bucking tool 534A may be positioned on the opposite side of the structure 532 from the outer drill plate 534B, as shown in FIGS. 27 and 30, and may be configured to provide the reaction force required to form the rivet R. A rivet installation tool, rivet gun, or other suitable tool or technology (e.g., the fastener insertion gun 40, described above) may then be used to force the rivets R against the backing plate 506 of the bucking tool 534A, as shown in FIG. 31, without the need for a technician to hold the bucking tool 534A during the process.

Figure 32:
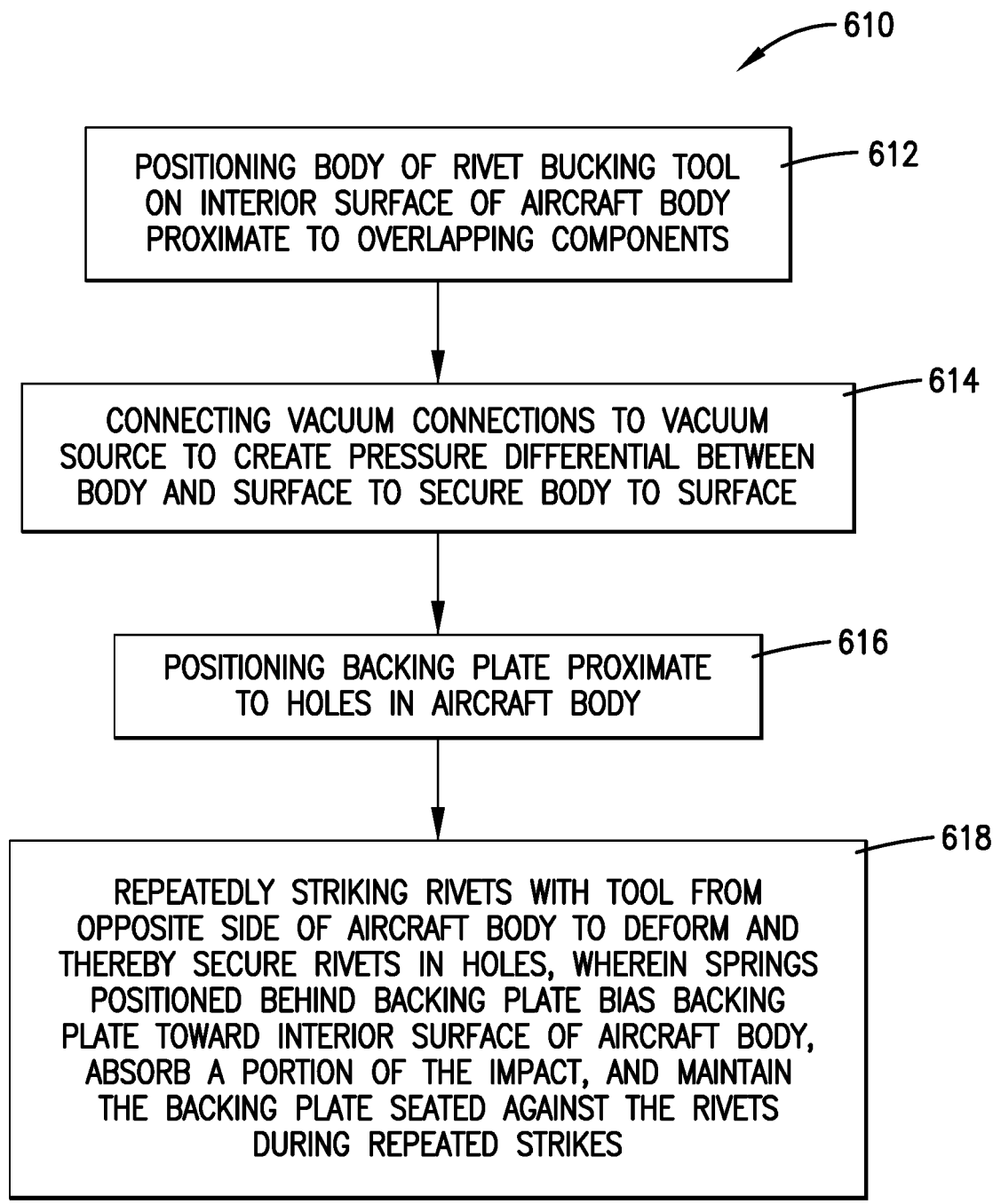
FIG. 32 is a flowchart of steps involved in the use and operation of the rivet bucking tool of FIGS. 20-31.

Referring also to FIG. 32, a method 610 of using the above-described rivet bucking tool 534A to install a plurality of rivets R in a plurality of holes H to secure together first and second overlapping components 533A,533B of an aircraft body 532 may comprise the following steps. The body 546 of the rivet bucking tool 534A, which comprises a shape matching a concave contour of the interior surface, may be positioned on an interior surface of the aircraft body 532 proximate to the first and second overlapping components 533A,533B, as shown in step 612. The one or more vacuum connections 551, which are attached to the body 546 of the rivet bucking tool 534A, may be connected to a vacuum source to create a pressure differential between the body 546 and the interior surface of the aircraft body 532 to secure the body 546 to the surface of the aircraft body 532, as shown in step 614.

The backing plate 506, which is associated with the body 546 of the rivet bucking tool 534A, may be positioned proximate to the plurality of holes H in the aircraft body 532, wherein the backing plate 506 is configured to provide a mass against which the plurality of rivets R is struck, as shown in step 616. The plurality of rivets R may be repeatedly struck with a tool from an opposite side of the aircraft body 532 to deform and thereby secure the plurality of rivets R in the plurality of holes H, wherein the plurality of springs 504 positioned behind the backing plate 506 bias the backing plate 506 toward the interior surface of the aircraft body 532 proximate to the plurality of holes H, absorb at least a portion of an impact of striking the plurality of rivets R, and maintain the backing plate 506 seated against the plurality of rivets R during repeated strikes by the tool located on the opposite side of the aircraft body 532, as shown in step 618.

Having thus described one or more embodiments of the invention, what is claimed as new and desired to be protected by Letters Patent includes the following:

1. A device for installing a plurality of fasteners in a plurality of holes to secure together first and second components of a vehicle structure, the device comprising:
a body comprising a shape which matches a contour of a surface of the vehicle structure;
one or more vacuum connections associated with the body and configured to connect to a vacuum source to create a pressure differential between the body and the surface of the vehicle structure to secure the body to the surface of the vehicle structure;
a backing plate associated with the body and positioned proximate to the plurality of holes in the vehicle structure when the device is in use, and configured to provide a mass against which the plurality of fasteners are struck from an opposite side of the vehicle structure to deform and thereby secure the plurality of fasteners in the plurality of holes; and
a plurality of springs positioned behind the backing plate and configured to bias the backing plate toward the surface of the vehicle structure proximate to the plurality of holes, and further configured to absorb at least a portion of an impact of striking the plurality of fasteners and to maintain the backing plate seated against the plurality of fasteners during repeated strikes by a tool located on the opposite side of the vehicle structure;
wherein the backing plate and the plurality of springs are incorporated into a central element associated with the body, and the central element is removable and replaceable with respect to the body to introduce a different backing plate having a different shape and a different plurality of springs having a different arrangement.

2. The device of claim 1, wherein the body is a carbon fiber reinforced resin three-dimensionally printed plate.

3. The device of claim 1, the backing plate further comprising a protective material configured to space the backing plate away from the surface of the vehicle structure.

4. The device of claim 1, wherein there are at least two rows of springs positioned behind the backing plate.

5. The device of claim 1, further comprising one or more handles associated with the body and configured to facilitate moving and positioning the device on the vehicle structure.

6. The device of claim 1, the body further comprising one or more vacuum channels provided on a side of the body which is proximate to the surface of the vehicle structure during use, the one or more vacuum channels being connected to the one or more vacuum connections and configured to facilitate creating the pressure differential to secure the body onto the surface of the vehicle structure.

7. The device of claim 6, the body further comprising a gasket material positioned and configured to seal the one or more vacuum channels to the surface of the vehicle structure to maintain the pressure differential.

8. A method of using the device of claim 1, the method comprising:
positioning the body on the surface of the vehicle structure;
connecting the one or more vacuum connections to the vacuum source to create the pressure differential;
positioning the backing plate proximate to the plurality of holes in the vehicle structure; and
repeatedly striking the plurality of fasteners with a tool from the opposite side of the vehicle structure to deform and thereby secure the plurality of fasteners in the plurality of holes.

9. The method of claim 8, further comprising absorbing impact from said striking by deforming the plurality of springs.

10. The method of claim 8, further comprising using one or more handles associated with the body to move and position the rivet bucking tool on the surface of the vehicle structure.

11. The method of claim 8, wherein the vehicle structure is first and second overlapping components of an aircraft body.

12. The method of claim 8, wherein the plurality of fasteners are rivets.

13. The method of claim 8, wherein the surface of the vehicle body is an interior surface of an aircraft body.

14. The method of claim 8, further comprising creating the pressure differential by drawing a vacuum via the vacuum connections through one or more vacuum channels in the body that open through a surface in contact with the vehicle structure.

15. The method of claim 14, further comprising compressing one or more gaskets to seal the one or more vacuum channels and thereby maintain the pressure differential.

16. A rivet bucking tool for installing a plurality of rivets in a plurality of holes to secure together first and second overlapping components of an aircraft body, the rivet bucking tool comprising:
  a body comprising—
    a carbon fiber reinforced resin three-dimensionally printed plate comprising a shape which matches a concave contour of an interior surface of the aircraft body, and
    one or more vacuum channels and a gasket material positioned and configured to seal the one or more vacuum channels to the aircraft body;
  one or more handles attached to the body and configured to facilitate moving and positioning the rivet bucking tool on the aircraft body;
  one or more manual vacuum connections attached to the body and configured to connect to a vacuum source to create a pressure differential within the one or more vacuum channels between the body and the interior surface of the aircraft body to secure the body to the surface of the aircraft body;
  a backing plate associated with the body and positioned proximate to the plurality of holes in the aircraft body when the rivet bucking tool is in use, and configured to provide a mass against which the plurality of rivets are struck from an opposite side of the vehicle structure so as to deform and thereby secure the plurality of rivets in the plurality of holes; and
  a plurality of springs positioned behind the backing plate and configured to bias the backing plate toward the interior surface of the aircraft body proximate to the plurality of holes, and further configured to absorb at least a portion of an impact of striking the plurality of rivets and to maintain the backing plate seated against the plurality of rivets during repeated strikes by a tool located on the opposite side of the aircraft body.

17. The rivet bucking tool of claim 16, wherein the backing plate and the plurality of springs are physically adapted to fit into a channel formed by a stringer component of the aircraft body in order to install the plurality of fasteners in the plurality of holes within the channel, wherein there is a single row of springs positioned behind the backing plate.

18. A method of using the device of claim 16, the method comprising:
  positioning the body on the interior surface of the aircraft body;
  connecting the one or more manual vacuum connections to the vacuum source to create the pressure differential;
  positioning the backing plate proximate to the plurality of holes in the aircraft body; and
  repeatedly striking the plurality of rivets with a tool from the opposite side of the aircraft body to deform and thereby secure the plurality of rivets in the plurality of holes.

* * * * *